US008705342B2

(12) United States Patent
Yu et al.

(10) Patent No.: US 8,705,342 B2
(45) Date of Patent: Apr. 22, 2014

(54) CO-SCHEDULING OF NETWORK RESOURCE PROVISIONING AND HOST-TO-HOST BANDWIDTH RESERVATION ON HIGH-PERFORMANCE NETWORK AND STORAGE SYSTEMS

(75) Inventors: Dantong Yu, Stony Brook, NY (US); Dimitrios Katramatos, Coram, NY (US); Alexander Sim, San Ramon, CA (US); Arie Shoshani, Berkeley, CA (US)

(73) Assignee: Brookhaven Science Associates, LLC, Upton, NY (US)

( * ) Notice: Subject to any disclaimer, the term of this patent is extended or adjusted under 35 U.S.C. 154(b) by 357 days.

(21) Appl. No.: 13/273,541

(22) Filed: Oct. 14, 2011

(65) Prior Publication Data

US 2012/0269053 A1  Oct. 25, 2012

Related U.S. Application Data

(60) Provisional application No. 61/393,750, filed on Oct. 15, 2010.

(51) Int. Cl.
*H04L 12/24* (2006.01)

(52) U.S. Cl.
USPC .......................................................... 370/216

(58) Field of Classification Search
CPC ..................................................... H04L 12/24
USPC .......................................................... 370/216
See application file for complete search history.

(56) References Cited

U.S. PATENT DOCUMENTS

| 2006/0176824 A1* | 8/2006 | Laver et al. .................. 370/241 |
| 2009/0161580 A1* | 6/2009 | Forsyth ......................... 370/254 |
| 2013/0254310 A1* | 9/2013 | Krywaniuk ................... 709/206 |

OTHER PUBLICATIONS

Yu, D., et al., "StorNet: Co-Scheduling Network and Storage with TeraPaths and SRM," Kickoff Meeting for 2009 DOE Network Research Projects, (Brookhaven National Laboratory, Upton, NY Sep. 28-29, 2009), pp. 1-51, [online], [retrieved Mar. 1, 2013] from: <URL:http://ieeexplore.eee.org/stamp/stamp.jsp?tp=& arnumber=5928792>.

Katramatos et al., "Establishment and Management of Virtual End-to-End QoS Paths Through Modern Hybrid WANs with TeraPaths," 2009 First International Conference on Evolving Internet, (Cannes/ La Bocca, French Riviera, France, Aug. 23-29, 2009), pp. 39-45, [online], [retrieved Oct. 31, 2012] From: <URL: http://ieeexplore. ieee.org/xpl/articleDetails.jsp?arnumber=5277880>.

Katramatos, D., "TeraPaths" Flow-Based End-to-End QoS Paths Through Modern Hybrid WANS, Joint Techs Workshop, pp. 1-22 (Brookhaven National Laboratory, Upton, NY, 2008), [online], [retrieved Nov. 1, 2012] From: <URL: http://www.terapaths.org/ project/presentations>.

(Continued)

*Primary Examiner* — Sulaiman Nooristany
(74) *Attorney, Agent, or Firm* — Dorene M. Price

(57) ABSTRACT

A cross-domain network resource reservation scheduler configured to schedule a path from at least one end-site includes a management plane device configured to monitor and provide information representing at least one of functionality, performance, faults, and fault recovery associated with a network resource; a control plane device configured to at least one of schedule the network resource, provision local area network quality of service, provision local area network bandwidth, and provision wide area network bandwidth; and a service plane device configured to interface with the control plane device to reserve the network resource based on a reservation request and the information from the management plane device. Corresponding methods and computer-readable medium are also disclosed.

43 Claims, 33 Drawing Sheets

(56) References Cited

OTHER PUBLICATIONS

Katramatos, D., "TeraPaths: Establishing End-to-End QoS Paths—The User Perspective," Joint Techs Workshop, pp. 1-23 (Brookhaven National Laboratory, Upton, NY, 2007), [online], [retrieved Nov. 1, 2012] From: <URL: http://www.terapaths.org/project/presentations>.

Sim, A., "Existing Components to be Used," pp. 1-8, [online], [retrieved Mar. 1, 2013] from: <URL:https://sdm.lbl.gov/twiki/bin/view/Projects/StorNet/Background>.

"Judges' Comments on the Problems and their Solutions," 2003/2004 ACM Collegiate Programming Contest, pp. 1-6, [online], [retrieved Jul. 15, 2011] From: <URL:http://www.informatik.uni-ulm.de/acm/Locals/2003/html/judge.html>, last accessed Nov. 16, 2012.

The Advanced Photon Source: Lighting the Way to a Better Tomorrow, pp. 1-8, [online], [retrieved on Jul. 16, 2011] from: <URL: http://www.aps.anl.gov/Science/Brochure/Files/aps_brochu>, last accessed Oct. 26, 2012.

An Introduction to the TeraPaths Project, pp. 1-5, [online], [retrieved Jul. 16, 2011], From <URL:https://www.racf.bnl.gov/terapaths/project/introduction>, last accessed Oct. 4, 2011.

Berkeley Storage Manager (BeStMan), pp. 1-2, [online], [retrieved Jul. 29, 2011] From <URL: https://sdm.lbl.gov/wiki/Software/BeStMan/>, last accessed Oct. 25, 2012.

Blake, S. et al., An Architecture for Differentiated Services, >, pp. 1-5, [online], [retrieved Jul. 15, 2011] from <URL:http://www.ietf.org/rfc/rfc2475.txt>, last accessed Oct. 25, 2012.

Braden, R. et al., Integrated Services in the Internet Architecture: An Overview, pp. 1-31, [online], [retrieved Aug. 9, 2011], from: <URL: IETF RFC 1633, http://www.ietf.org/rfc/rfc1633.txt>, last accessed Oct. 25, 2012.

Bradley, S. et al., TeraPaths: A QoS-Enabled Collaborative Data Sharing. Infrastructure for Peta-Scale Computing Research, pp. 1-4, [online], [retrieved Dec. 11, 2012] from: <URL: https://www.racf.bnl.gov/terapaths/project/publications/BNL-TeraPaths-Paper-CHEP06.pdf>.

Chen, B. et al., "Scheduling Deadline-Constrained Bulk Data Transfers to Minimize Network Congestion," Seventh IEEE International Symposium on Cluster Computing and the Grid pp. 410-417, [online], [retrieved Oct. 25, 2012] From: <URL:http://ieeexplore.ieee.org/xpls/abs_all.jsp?arnumber=4215406 >.

Conclusions of the 2nd TeraPaths Interoperability Workshop, pp. 1-3, (Brookhaven National Laboratory, May 9, 2007), [online], [retrieved Nov. 2, 2012] From: <URL: http://www.terapaths.org/project/publications>.

Curti, C. et al., "On Advance Reservation of Heterogeneous Network Paths", *Future Generation Computer Systems*, vol. 21, pp. 525-538, 2005, [online], [retrieved Oct. 25, 2012] From: <URL: http://www.sciencedirect.com/science/article/pii/S0167739X04001670>.

Doe Science Networking Challenge: Roadmap to 2008, [online], [retrieved Oct. 25, 2012] From: <URL: http:/www.es.net/hypertext/welcome/pr/Roadmap/Roadmap%20t0%202008.pdf>, pp. 9-12, Bibliographic page and Table of Contents.

Donno, F. at al., "Storage Resource Manager Version 2.2: Design, Implementation, and Testing Experience," International Conference for Computing in High Energy and Nuclear Physics, pp. 1-10, 2007 [online], [retrieved Oct. 25, 2012] From: <URL: http://lss.fnal.gov/archive/2008/conf/fermilab-conf-08-690-cd.pdf>.

Dynamic Circuit Network (DCN), pp. 1-2, 2011, [online], [retrieved Jul. 29, 2011] From: <URL: http://www.internet2.edu/network/dc/>, last accessed Oct. 26, 2012.

Ernst, M. et al., "TeraPaths: End-to-End QoS-Enabled Networking in Support of LHC Physics for US Atlas," Brookhaven Nat'l Labs, Upton, NY, pp. 1-2 and Appendix, (2010).

Ferrari, D. et al., "Distributed Advance Reservation of Real-Time Connections," *Multimedia Systems*, vol. 5, pp. 187-198, 1997 [online], [retrieved Oct. 31, 2012] From: <URL: http://www.springerlink.com/content/5v773744r6542062/>.

Foster, I. et al, "End-to-End Quality of Service for High-End Applications," *Computer Communications*, vol. 27, pp. 1375-1388, (2004).

Gibbard, B. et al., "TeraPaths: End-to-End Network Path QoS Configuration Using Cross-Domain Reservation Negotiation," Broadband Communications, Networks and Systems, 2006, BROADNETS 2006, 3rd International Conference, pp. 1-9, [online], [retrieved Oct. 31, 2012] From: <URL: https://www.racf.bnl.gov/terapaths/team/project/publications/94.pdf>.

Gibbard, B. at al., "TeraPaths: End-to-End Network Path QoS Configuration Using Cross-Domain Reservation Negotiation," GridNets, pp. 1-22, (Brookhaven National Laboratory, Upton, NY, 2006).

Hafid, A. et al., "A Quality of Service Negotiation Approach with Future Reservations (NAFUR): A Detailed Study", *Computer Networks and ISDN Systems*, vol. 30, pp. 777-794, 1998.

"High-Performance Networks for High-Impact Science," Report of the Aug. 13-15, 2002 High-Performance Network Planning Workshop, pp. ii-x, [online], [retrieved Oct. 31, 2012] From: <URL: http://www.osti.gov/energycitations/purl.cover.jsp?purl=/15010109-Azf17R/native/>.

Katramatos, D., "TeraPaths: Configuring End-to-End Virtual Network Paths with QoS Guarantees," Tier 3 Workshops, pp. 1-9, (Brookhaven National Laboratory, Upton, NY, 2007), [online], [retrieved Nov. 1, 2012] From: <URL: http://www.terapaths.org/project/presentations>.

Katramatos, D., "TeraPaths: Establishing End-to-End QoS Paths Through L2 and L3 WAN Connections", Joint Techs Workshop, pp. 1-21, (Brookhaven National Laboratory, Upton, NY, 2007), [online], [retrieved Nov. 1, 2012] From: <URL: http://www.terapaths.org/project/presentations>.

Katramatos, D. et al., "The TeraPaths Testbed: Exploring End-to-End Network QoS," TridentCom, pp. 1-30, (Brookhaven National Laboratory, Upton, NY, 2007), [online], [retrieved Nov. 1, 2012] From: <URL: http://www.terapaths.org/project/presentations>.

Katramatos et al., "TeraPaths: Managing Flow-Based End-to-End QoS Paths Experience and Lessons Learned," CEWITT, pp. 1-20 (Brookhaven National Laboratory, Upton, NY, 2008), [online], [retrieved Nov. 1, 2012] From: <URL: http://www.terapaths.org/project/presentations>.

Katramatos et al., "TeraPaths: End-to-End Network Resource Scheduling in High-Impact Network Domains," *International Journal on Advances in Internet Technology*, vol. 3, pp. 104-117, 2009 [online] [retrieved Oct. 31, 2012] From: <URL: http://www.thinkmind.org/index.php?view=article&articleid=inttech_v3_n12_2010_9>.

Katramatos et al., "The TeraPaths TestBed: Exploring End-to-End Network QoS," *Proceedings of the 3rd International Conference on Testbeds and Research Infrastructures for the Development of Networks and Communities*, pp. 1-7, 2010, [online], [retrieved Oct. 31, 2012] From: <URL: http://ieeexplore.ieee.org/xpls/abs_all.jsp?arnumber=4444698&tag,=1>.

Lambda Station Project [online], [retrieved Jul. 29, 2011] From: URL:<http://www.lambdastation.org/>, pp. 1-2 last accessed Oct. 25, 2012.

Lehman, T. et al., "Control Plane Architecture and Design Considerations for Multi-Service, Multi-Layer, Multi-Domain Hybrid Networks," pp. 1-2, High-Speed Networks Workshop, 2007, [online], [retrieved Oct. 31, 2012] From: <URL: http://ieeexplore.ieee.org/xpls/abs_all.jsp?arnumber=4290549.>.

The New Sky LSST, pp. 1, [online], [retrieved Jul. 13, 2011] From: <URL: http://www.lsst.org/lsst/> last accessed Oct. 31, 2012.

LSST E-News, vol. 4, No. 2, Jul., 2011 pp. 1-3, [online] [retrieved Jul. 16, 2011] From: URL: <http://www.lsst.org/News/enews/data-sharing-201107.html>.

Mannie, E., "Generalized Multi-Protocol Label Switching (GMPLS) Architecture," pp. 1-65, Oct. 2004, [online], [retrieved Aug. 9, 2011] From: <URL: http://www.ietf.org/html/rfc3945>, last accessed Oct. 31, 2012.

Minutes of Network QoS Applied to GRIDs BOF (GGF4), pp. 1-4, [online] [retrieved Jul. 15, 2011] From: <URL: http://server11.infn.it/netgrid/ggf/ggf4-qos-bof#index.html>, last accessed Oct. 31, 2012.

Morgan, C., *"Programming from Specifications"*, 2nd Edition, (Prentice Hall International (UK) Limited), pp. 209-216, 1998, with title page and bibliographic page.

(56) References Cited

OTHER PUBLICATIONS

Oscars, pp. 1-3, [online] [retrieved Jul. 15, 2011], From: <URL: http://www.es.net/services/virtual-circuits-oscars/software/configuration/oscars/>, pp. 1-3 no longer available on website.

perfSONAR, 1 page, [online], [retrieved Jul. 29, 2011] From: <URL: http://www.perfsonar.net> last accessed Oct. 31, 2012.

Phoebus: High-Performance Data Transfer for Dynamic Circuit Networks, pp. 1, [online] [retrieved Jul. 15, 2011] From: <URL: http://e2epi.internet2.edu/phoebus.html> last accessed Oct. 31, 2012.

Rajah, K. et al., "Advance Reservation and Scheduling for Bulk Transfers in Research Networks," *IEEE Transactions on Parallel and Distributed Systems*, vol. 20, pp. 1682-1697, 2009 [online] [retrieved Oct. 31, 2012] From: <URL: http://ieeexplore.ieee.org/stamp/stamp.jsp?tp=&arnumber=4711045>.

Rosen, E. et al., "Multiprotocol Label Switching Architecture," pp. 1-57, Jan. 2001, [online], [retrieved Aug. 9, 2011] From: <URL: http://www.hjp.at/doc/rfc/rfc3031.html>, last accessed Oct. 31, 2012.

Sander, V. et al., "A Differentiated Services Implementation for High-Performance TCP Flows," *Computer Networks*, vol. 34, pp. 915-929, 2000 [online], [retrieved Oct. 31, 2012] From: <URL: http://www.sciencedirect.com/science/article/pii/S1389128600001626>.

Shoshani, A. et al., "Storage Resource Managers: Middleware Components for Grid Storage," 10*th* Goddard Conference on Mass Storage Systems and Technologies in Cooperation with the 19th IEEE Symposium on Mass Storage Systems, pp. 209-223 with Cover Pages, Bibliographic Pages and Table of Contents [online], [retrieved Oct. 31, 2012] From: <URL: http://ntrs.nasa.gov/archive/nasa/casi.ntrs.nasa.gov/20020045439_2002065049.pdf#page=219>.

Shoshani, A. et al., "Storage Resource Managers: Essential Components for the Grid," in *Grid Resource Management: State of the Art and Future Trends*, Nabrzyski, J., Schopf, J. and Weglarz, J., Eds., (Kluwer Academic Publishers), pp. 329-348, Apr. 2002, with title page and bibliographic page [online], [retrieved Oct. 31, 2012] From: <URL: https://twiki.grid.iu.edu/twiki/bin/viewfile/Storage/WebHome/SRM1.book.chapter.pdf>.

Sim, A. et al., "DataMover: Robust Terabyte-Scale Multi-file Replication Over Wide-Area Networks," 16th International Conference on Scientific and Statistical Database Management (Santorini Island, Greece, Jun. 21-23, 2004), pp. 1-10, [online], [retrieved Nov. 1, 2012] From: <URL: http://ieeexplore.ieee.org/stamp/stamp.jsp?arnumber=01311236>.

Sim, A. et al., "The Storage Resource Manager Interface Specification Version 2.2," May 23, 2008, [online], [retrieved Nov. 1, 2012] From: <URL: http://ww.ogf.org/documents/GFD.129.pdf> pp. 1-104.

Sim, A. et al., "Storage Resource Manager Interface Specification V2.2 Implementations Experience Report," pp. 1-22, Aug. 18, 2009, [online], [retrieved Nov. 1, 2012] From: <URL: https://ogf.org/documents/GFD.154.pdf>.

"TeraPaths and Dynamic Circuits," Joint Tech Workshop, pp. 1-6, (Brookhaven National Laboratory, 2008), [online], [retrieved Nov. 2, 2012] From: <URL: http://www.terapaths.org/project/presentations>.

"TeraPaths: Current Status," 2nd TeraPaths Interoperability Workshop, pp. 1-10, (Brookhaven National Laboratory, May 9, 2007), [online], [retrieved Nov. 2, 2012] From: <URL: http://www.terapaths.org/project/presentations>.

"TeraPaths: Establishing End-to-End Guaranteed Bandwidth Network Across Multiple Administrative Domains," CHEP, (Brookhaven National Laboratory, 2007), 1 page, [online], [retrieved Nov. 2, 2012]From: <URL: http://www.terapaths.org/project/publications>.

Yu, D. et al. "TeraPaths Addendum US—ATLAS Project: Advanced Networking Capability for Tier1 to Tier 2 Rapid Data Distribution," pp. 1-10 and cover page, [online], [retrieved Nov. 1, 2012] From: <URL: http://www.terapaths.org/project/documents/TeraPaths-Addendum-v11.doc/view>.

Yuan, L. et al., "A Probing Approach for Effective Distributed Resource Reservation," *Lecture Notes in Computer Science: Quality of Service in Multiservice IP Networks*, vol. 2601/2003, pp. 11-16, 2003, with cover page, title page and bibliographic page.

\* cited by examiner

Domain coordination models

MPLS Tunnel

Dynamic Circuit

(a) Consolidated reservation $(r^b_1 + r^b_2)(r^e_2 - r^s_1)$ (b) Consolidated reservation $r^b_1(r^e_2 - r^s_1)$ Illustration of reservation.

initiation:  let $R$ be the set of given requests ordered by start time ($r_1^s$)
             $N_{max}$ is the number of available VLAN IDs (circuits)
             Set $k = 1$
while $R$ is not empty and $k \leq N_{max}$ do {
        set $r = 1^{st}$ element of $R$
        remove $r$ from $R$ ($R = R - r$)
        set $R' = R$, order by increasing reservation volume
        for each $r' \in R'$ do {
                if $r$ and $r'$ can be consolidated, i.e.:
                        1) are "close enough" or overlap
                        2) consolidated bandwidth h does not exceed $C$
                        3) consolidated volume does not violate minimum utilization
                        then {
                                consolidate $r$ and $r'$, set $r = r + r'$
                                remove $r'$ from $R$, set $R = R - r'$
                        } else {
                                if $r'^b > C$ then {
                                        remove $r'$ from $R$, set $R = R - r'$
                                        (it won't be considered again)
                                } // end if
                        } //end if
        } // end for
        if $r^b \leq C$ then {
                assign requests consolidated in $r$ to circuit with VLAN ID
                corresponding to $k$ (e.g., if $r = r_p + r_q$, set $x_{pk} = x_{qk} = 1$)
                increment k
        } // end if
} //end while
verification:  if resulting circuits overlap in time, verify that total bandwidth does
               not exceed $C$. If total bandwidth exceeds $C$, remove circuit
        servicing
               least number of requests

*Fig. 14*

```
Append a dummy window with zero height and zero width to the list of windows
Merge successive windows of equal bandwidth (enforce $b_q <> b_p$, $q=p+1$, $p=1..n$)
For each window i from left to right{
    If (stack.empty() == true or bandwidth of current window $b_i$ > stack.top(). Bandwidth) {
        push window i, set start[i] = $s_i$
    } else {
        repeat {
            pop window j, set end [j] =$S_i$, set k = j
        } until (stack.empty() == true or $b_i$ >= stack.top().bandwidth)
        If (stack.empty() == false and stack.top().bandwidth == $b_i$) {
            Set start[i] = start[stack.top()]
        } else {
            set start[i] = start[k], where k is the last popped window
        }
        push window i
    }
}
```

*Fig. 24*

CO-SCHEDULING OF NETWORK RESOURCE PROVISIONING AND HOST-TO-HOST BANDWIDTH RESERVATION ON HIGH-PERFORMANCE NETWORK AND STORAGE SYSTEMS

CROSS-REFERENCE TO RELATED APPLICATION

This application claims the benefit of U.S. Provisional Application No. 61/393,750 filed on Oct. 15, 2010, the disclosure of which is incorporated herein by reference in its entirety.

This invention was made with support from the U.S. Government under Contract Nos. DE-AC02-98CH10886 and DE-AC02-05CH11231, which was awarded by the U.S. Department of Energy. The U.S. Government has certain rights in the invention.

BACKGROUND

1. Field

Embodiments disclosed herein are directed to a system that co-schedules network resource provisioning and host-to-host bandwidth reservation on high-performance network and storage systems.

2. Description of Related Art

Data-intensive application communities, including high energy and nuclear physics, astrophysics, climate modeling, nanoscale materials science, and genomics are expected to generate exabytes of data over the next five years. Such data must be transferred, analyzed, and visualized by geographically distributed teams of scientists. This expectation of explosive growth in stored data and globally distributed data processing needs, underpinned by the maturing grid and cloud computing technologies, has generated critical requirements for new predictable and well-behaved data transfer technologies and automated tools. To expedite scientific discoveries, these data transfer tools need to intelligently assist scientists in replicating large volumes of data whenever and wherever necessary.

Existing data transfer techniques face unprecedented challenges in handling not only the volume of data, but also the heterogeneous environment where data are imported and exported. An obstacle to managing these challenges is the inability to provide end-to-end bandwidth guarantees from source storage systems to destination storage systems. Further, technology advancements give rise to performance improvements while also increasing the complexity of resource management and provisioning. Data storage technologies have demonstrated significant improvements through the use of advanced parallel file systems that enhance I/O bandwidth, and solid state disks (SSD) that can provide read/write access as much as ten times faster than hard drives.

SUMMARY

In one embodiment, a host-to-host, cross-domain network resource reservation scheduler is provided. The host-to-host cross-domain network resource reservation scheduler may include one or more host-to-host routes including multiple path segments between two or more end-site hosts that belong to different end-sites. The host-to-host cross-domain network resource reservation scheduler system is divided into different planes of functionality, including at least a data plane, service plane, control plane, and management plane.

The data plane includes network resources, such as network infrastructure and network devices, which send and receive data. The management plane includes network resource performance and fault monitors that monitor network resource functionality and performance, diagnose faults, coordinate fault recovery attempts, and provide management plane feedback. The control plane includes network resource schedulers and quality of service (QoS) provisioning, bandwidth provisioning, and circuit reservation modules that allocate network resources and packet priorities. The service plane includes controllers and modules that show system component functionalities, provide authentication and authorization, and interface with the control plane to reserve network resources residing in the data plane based on application requests and management plane feedback.

Various elements operate at a plurality of end-sites having one or more path segments that span one or more local area network (LAN) domains. These elements can include a plurality of network resources, one or more network device controller modules (NDCs), one or more end-site domain controller modules (ESDCs), one or more distributed services modules (DSMs), and one or more LAN domains. The plurality of network resources resides in, the data plane and is connected to a LAN. The one or more NDCs reside in the control plane, configure the plurality of network resources, securely expose network resource configuration performance, and fault monitor functionality to ESDCs. The one or more LAN domains reside in the data plane, are controlled by ESDCs residing in the control plane and configured by one or more NDC's. These LAN domains connect to one or more wide area networks (WANs) through one or more end-site border routers. The one or more DSMs, include network resource schedulers and reservation mechanisms, residing within the service plane, that access and reserve allocations of the plurality of network resources, as well as LAN performance and fault monitors residing within the management plane, and interface with a local ESDC and at least one remote ESDC to reserve resources for path segments within the LANs of the end-sites.

Various elements also operate between the plurality of end-sites, and may include a plurality of network resources, one or more inter-domain controllers (IDCs), one or more path segments, and one or more WAN domains. The plurality of network resources resides in the data plane and is connected within the WAN. The one or more path segments reside in the data plane and span one or more WAN domains. The one or more IDCs reside in the service plane and control the one or more WAN domains. The IDCs include a backbone network performance and fault monitor residing in the management plane and also include a backbone network bandwidth provisioning and circuit reservation module residing within the control plane. A DSM, after reserving resources for path segments in the local and remote end-site LANs, interfaces with the one or more WAN IDCs to reserve resources for one or more path segments and coordinate all WAN domains along the one or more routes (i.e., the end-to-end resource reservation is done in a hybrid star/daisy-chain manner). The IDCs provide virtual point-to-point links (circuits) between the local and remote end-site LANs using MPLS, GMPLS, etc., technologies. Virtual circuits may be configured to accommodate one or more flows or flow groups.

The one or more network resources may be co-scheduled with data storage systems resources including non-transitory computer readable media devices residing within the data plane. In this case, the service plane would include storage resource managers (SRMs), including a data storage systems performance and fault monitor residing within the management plane and also including a data storage systems scheduler residing within the control plane that accesses and reserves data storage system resources.

DSMs may also incorporate auxiliary modules to encapsulate the functionality of a targeted domain controller by invoking application programming interfaces (APIs), and expose standardized abstract interfaces. LANs and WANs may also include wireless networks. WANs may also include dynamic circuit networks (DCNs).

In one embodiment, a cross-domain network resource reservation scheduler configured to schedule a path from at least one end-site is disclosed, which includes a management plane device configured to monitor and provide information representing at least one of functionality, performance, faults, and fault recovery associated with a network resource; a control plane device configured to schedule by at least one of the network resource, provision local area network quality of service, provision local area network bandwidth, and provision wide area network bandwidth; and a service plane device configured to interface with the control plane device to reserve the network resource based on a reservation request and the information from the management plane device, the management plane device, control plane device, and service plane device being associated with the end-site.

The scheduler may include at least one local area network operatively coupled by communication links to at least one wide area network. The scheduler may include at least one network device controller (NDC) configured to control configuration of network devices associated with a local area network associated with the end-site; an end-site domain controller (ESDC) configured to control a resource associated with the local area network using the at least one NDC; and a distributed services module (DSM) configured to interface with the at least one ESDC to configure path segments associated with the local area network. The DSM may be configured to interface with an inter-domain controller (IDC) to provide the path from the at least one end-site.

The scheduler may also include a hybrid star/daisy-chain configuration scheme in which the DSM is configured to negotiate end-site LAN reservation parameters and to subsequently negotiate WAN reservation parameters using the IDC. The NDC may include functionality of the network resource, thereby hiding configuration information from the control plane device and management plane device. Dynamic service level agreements (SLAs) may be established between network domains along the path from the at least one end-site, and the service plane device may be configured to consolidate overlapping reservation requests using user-defined virtual local area network identification (VLAN ID), bandwidth utilization levels, and total capacity constraints. The service plane device may be configured to assign consolidated reservation requests to a circuit based on duration and capacity associated with the circuit.

The service plane device may be configured to generate a bandwidth usage graph (BUG) associated with at least one prior reservation request as a step function, and subtract the BUG from a maximum bandwidth availability associated with the network resource to obtain a bandwidth availability graph (BAG) associated with the network resource. The service plane device may be configured to intersect a plurality of BAGs to obtain an end-to-end BAG, wherein each of the plurality of BAGs is associated with at least one of a plurality of network resources associated with the path from the at least one end-site, and allocate a new reservation request based on the end-to-end BAG. The service plane device may be configured to allocate the new reservation request based on the end-to-end BAG using an algorithm to determine largest rectangles under a histogram, and modify bandwidth and duration associated with the new reservation request while maintaining data volume associated with the new reservation request constant, thereby fitting the new reservation request within the largest rectangles associated with the end-to-end BAG and satisfying at least one of earliest start time constraint and latest end time constraint associated with the new reservation request.

The DSM may be configured to establish reservation parameters associated with the wide area network using a trial-and-error method with predetermined solutions, and the network resource may be configured to at least one of send data and receive data. An SRM may be configured to negotiate storage and transfer parameters, and negotiate network bandwidth reservation parameters with the DSM. The SRM may represent storage system bandwidth availability as a bandwidth availability graph (BAG), and the DSM may determine network bandwidth reservation parameters using the BAG and reservation request parameters. The DSM may be configured to intersect a plurality of BAGs along the path from the at least one end-site to obtain an end-to-end BAG, wherein each of the plurality of BAGs may be associated with at least one of a plurality of network resources along the path from the at least one end-site, and the DSM may be configured to allocate a new reservation request based on the end-to-end BAG. The storage resource may be configured to at least one of send, receive, and store data. The cross-domain network resource reservation scheduler may be configured to schedule the at least one end-to-end path from the at least one end-site and provide network quality of service guarantees across multiple autonomous domains having different levels of hertogeneity in at least one of administrative policy, control plane technology, and data plane technology without at least one of prior inter-domain Service Level Agreements and predetermined configuration of network devices associated with the domains.

In another embodiment, a method of scheduling reservations on a path from at least one end-site is provided, which includes monitoring, by a management plane device, and providing information representing at least one of functionality, performance, faults, and fault recovery associated with a network resource; scheduling, by a control plane device, the network resource by at least one of provisioning local area network quality of service, provisioning local area network bandwidth, and provisioning wide area network bandwidth; and interfacing, by a service plane device, with the control plane device to reserve the network resource based on a reservation request and the information from the management plane device, the management plane device, control plane device, and service plane device being associated with the end-site.

In yet another embodiment, a computer-readable medium comprising instructions that, when executed by a computing device, schedule reservations on a path from at least one end-site by performing a computer process is disclosed, which includes monitoring, by a management plane device, and providing information representing at least one of functionality, performance, faults, and fault recovery associated with a network resource; scheduling, by a control plane device, the network resource by at least one of provisioning local area network quality of service, provisioning local area network bandwidth, and provisioning wide area network bandwidth; and interfacing, by a service plane device, with the control plane device to reserve the network resource based on a reservation request and the information from the management plane device, the management plane device, control plane device, and service plane device being associated with the end-site.

Any combination of the above features is envisioned. Other objects and features will become apparent from the following detailed description considered in conjunction with the accompanying drawings, wherein like reference numerals in the various drawings are utilized to designate like components. It is to be understood, however, that the drawings are designed as an illustration only and not as a definition of the limits of the invention.

BRIEF DESCRIPTION OF THE DRAWINGS

FIG. 14 is a listing of a BACA algorithm.

FIG. 24 is a listing of a stack-based largest rectangle algorithm.

DETAILED DESCRIPTION

Figure 1:
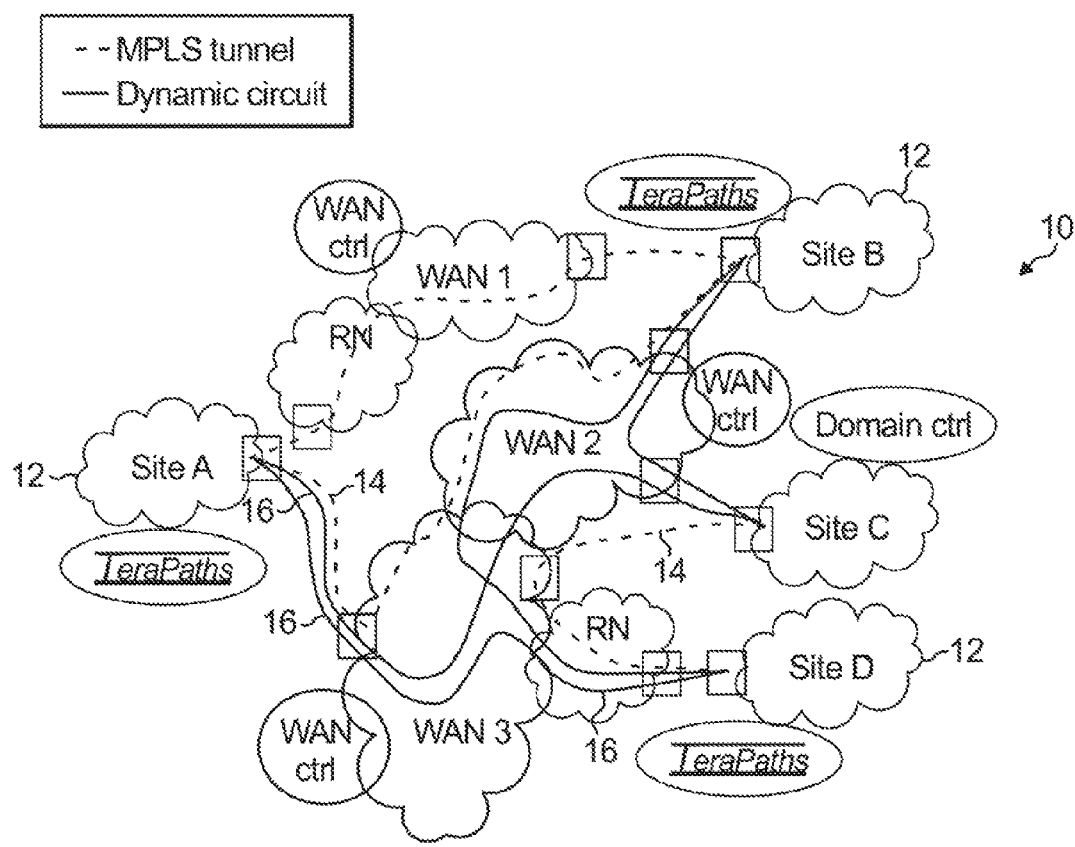
FIG. 1 shows a block diagram of a framework of end-to-end paths that have been established across multiple network domains.

Scientific data-intensive applications have brought about the need for novel data transfer technologies and automated tools capable of effectively utilizing available raw network bandwidth and intelligently assisting scientists in replicating large volumes of data to desired locations in a timely manner. A host-to-host, cross-domain storage and network resource reservation co-scheduler, which is disclosed and referred to herein as StorNet, is an integrated end-to-end resource provisioning and management system for high performance data transfers that can operate with heterogeneous network protocols and storage systems in a federated computing environment. StorNet allocates and co-schedules storage and network resources involved in data transfers. StorNet is based on system capabilities, such as the storage resource manager (SRM), TeraPaths, and OSCARS, which are described in greater detail herein. StorNet provides data intensive applications with the capability of predictable, yet efficient delivery of data at rates of multiple gigabits/second, thereby bridging end-to-end advanced storage and network technologies in a transparent manner.

A framework that enables the scheduling of network resources in the context of data-intensive scientific computing is disclosed and referred to herein as TeraPaths. Wide area networks, such as ESnet and Internet2, provide network resource reservation capabilities in the form of virtual circuits. The TeraPaths framework utilizes these circuits and extends them into end-site local area networks to establish end-to-end virtual paths between end-site hosts. These paths are dedicated to specific users and/or applications and provide guaranteed resources, thereby minimizing or eliminating adverse effects of network congestion. An overview of TeraPaths including issues raised by the end-to-end resource reservation-based networking paradigm, implications and benefits for end users and applications, and scalability issues and optimization techniques for wide area network circuit reservations are discussed herein.

Data-intensive application communities, including high energy and nuclear physics, astrophysics, climate modeling, nanoscale materials science, and genomics are expected to generate exabytes of data over the next five years. Such data must be transferred, analyzed, and visualized by geographically distributed teams of scientists. This expectation of explosive growth in stored data and globally distributed data processing needs, underpinned by the maturing grid and cloud computing technologies, has generated critical requirements for new predictable and well-behaved data transfer technologies and automated tools. To expedite scientific discoveries, these data transfer tools need to intelligently assist scientists in replicating large volumes of data whenever and wherever necessary. Existing data transfer techniques face unprecedented challenges in handling not only the volume of data, but also the heterogeneous environment where data are imported and exported. An obstacle to managing these challenges is the inability to provide end-to-end bandwidth guarantees from source storage systems to destination storage systems.

Further, technology advancements give rise to performance improvements while also increasing the complexity of resource management and provisioning. Recently, two major research and education networks, ESnet, run by the U.S. Department of Energy (DOE), and Internet2, have been enhanced with advanced dynamic circuit switching technologies and network resource reservation systems to ensure on-demand bandwidth guarantees and quality of service (QoS). Data storage technologies have demonstrated significant improvements as well through the use of advanced parallel file systems that enhance I/O bandwidth, and solid state disks (SSD) that can provide read/write access as much as ten times faster than hard drives. StorNet addresses the end-to-end resource provisioning and management issues encountered in automated data transfers by seamlessly integrating advanced network resource reservation capabilities with enhanced storage resource management (SRM) technology.

The goals of StorNet include providing an integrated end-to-end resource provisioning system for high performance data transfers; improving resource utilization by co-scheduling network and storage resources and ensuring data transfer efficiency; supporting end-to-end data transfers with a negotiated transfer completion timeline; scheduling network usage and storage resources as a first class resource through virtualization; providing a holistic approach for DOE data-intensive applications to share data; and providing data management capabilities commensurate with exascale computing.

Common requirements among experimental science applications that are of critical importance to large experimental facilities, such as the Large Synoptic Survey Telescope (LSST), the Large Hadron Collider (LHC), the Spallation Neutron Source (SNS), the Advanced Photon Source (APS), and the Relativistic Heavy Ion Collider (RHIC), include the following: (i) intensive data transfers; (ii) remote visualizations of datasets and ongoing computations; (iii) computational monitoring and steering; and (iv) remote experimentation and control. These applications utilize a wide variety of platforms, hardware, network, storage media, and software components to deliver critical data storage functionality, such as: file servers, various FTP servers, mass storage systems, relational databases, and web servers for serving files and on-line streaming video. Storage and processing of raw data takes place at geographically distributed computing facilities. Thus, sharing data across the globe is realized through transfers over high-speed networks. Since the default network behavior is to treat all data flows equally, data flows of higher priority and/or urgency may be adversely impacted by competing data flows of lower priority. In distributed data-intensive environments, this can be a major problem that significantly degrades the effective so-called "goodput" of the overall system. The policies and priorities of user communities cannot be effectively expressed or implemented in the network without highly labor-intensive and error-prone human intervention.

There is an evident need for coordination between storage resources and network systems to better service data transfers of the user community. From the network perspective, the capability to prioritize, protect, and regulate various data flows is of critical importance since this capability can be used for deterministically scheduling network resources to support user community priorities and co-schedule associated resources, such as storage systems. From the storage system perspective, source and destination storage systems need to have adequate bandwidth and storage allocation to take advantage of the network capabilities and increase the reliability and predictability of a transfer. Further, data transfers typically have a lengthy duration and transient failures are likely to occur. Thus, failure detection and recovery mechanisms are also important.

The primary goal of StorNet is to achieve the coordination of storage and network resources by taking advantage of existing systems, making them interoperable, and augmenting their functionality. In addition to storage resource provisioning and coordination between source and target storage systems, bandwidth provisioning coordination between the storage systems and the underlying network resources is also performed. The systems used by StorNet are the storage resource manager (SRM) known as the Berkeley Storage Manager (BeStMan), the TeraPaths end-to-end virtual network path reservation system, and ESnet's On-demand Secure Circuits and Advance Reservation System (OSCARS) network provisioning tool, which is supported by both ESnet and Internet2.

End-to-end scheduling of data movement utilizes the following: availability of network bandwidth on the backbone wide area network (WAN); availability of local area network (LAN) bandwidth from end hosts to the border routers of the WAN; availability of data to be moved out at the source; availability of storage space at the target; availability of bandwidth at the source storage system; and availability of bandwidth at the target storage system. This is difficult due to the need to coordinate source and target bandwidths to match each other within available windows, and the need to coordinate these resources with internal and existing network bandwidth.

TeraPaths targets network domains (sets of related users and systems connected by networks) that are considered "high-impact". Typical network use for a given system characteristically utilizes few-to-many, small bandwidth, short duration network flows, common examples of which include email, web browsing, and occasional file transfers. However, there is a much smaller set of systems that regularly transfer large amounts of data over the network. Typically, this may involve bandwidth-intensive applications or large files (data, movies, games, HD video-conferencing, and the like) and may use a significant portion of the available bandwidth along a network path. Some of these large flows may have additional requirements regarding packet loss, delay, and jitter, as well as overall deadline scheduling needs that are critical to the specific user or application. High-impact domains are referred to herein as those sets of users and systems that need to transfer large amounts of data through the network and that may require additional control over network related characteristics of their critical flows, which include real-time or interactive flows, such as video-conferencing, real-time instrument control, conference audio/visual streaming, and the like.

The high-impact domains envisioned for use with TeraPaths support are in the e-science area, in which significant amounts of data need to be shared across wide-area networks (WANs) and additional important considerations regarding timeliness of data transfers and their corresponding flow characteristics are important to the success of the applications involved. In particular, grid-computing infrastructures are already broadly deployed and may be considered synonymous with high-impact domains. Virtual organizations (VOs) built upon grids would benefit significantly from end-to-end predictability of network paths interconnecting their shared resources. While small in number (by their relative count of users or end-sites) these domains can have a disproportionally disruptive effect on the network and are thus referred to herein as high-impact domains.

Not all large-scale flows are of equal importance or criticality. In conventional research and education networks, large-scale flows corresponding to high-energy physics data transfers, eVLBI astronomy, bio-informatics, and life sciences, as well as peer-to-peer traffic sharing movies, applications, music, and other multimedia content can be found.

Even within a networked collaboration of users, some large-scale transfers may have significantly different importance, but are currently treated equivalently by best effort networks. Part of the motivation behind TeraPaths is to give researchers the tools they need to most effectively utilize the resources they can access.

Some networking technologies, such as the Differentiated Services (DiffServ), Integrated Services (IntServ), Multi-Protocol Label Switching (MPLS), and Generalized MPLS (GMPLS) architectures, have the capability of providing resource guarantees. In practice, however, the scope of network connections utilized by distributed applications spans multiple autonomous domains. These domains typically have different levels of heterogeneity in at least one of administrative policy, control plane technology, and data plane technology, making it difficult or impossible to provide network QoS guarantees using a single architecture across all domains. For example, Differentiated Services Code Point (DSCP) packet markings, used in the DiffServ architecture, are by default reset at ingress points of network domains. As such, the DiffServ architecture is ineffective across domains without at least one of prior inter-domain Service Level Agreements (SLAs) in effect and proper predetermined configuration of the network devices associated with the domains.

A hybrid solution to the problem involves individual network segments utilizing different underlying technologies. From the end user perspective, however, these technologies are seamlessly tied together to ensure end-to-end resource allocation guarantees. This hybrid solution creates a new networking model that transparently co-exists, but fundamentally differs from the standard best-effort model. Under the new model, it is possible to allocate network resources through advance reservations and dedicate these resources to specific data flows. Each such flow or flow group is steered into its own virtual network path, which ensures that the flow will receive a pre-determined level of QoS in terms of bandwidth and/or other parameters.

Virtual paths can include several physical network segments and span multiple administrative domains. These domains use coordination to establish the virtual path. Coordination takes place by interoperating web services. Domains expose a set of web services that enable reservation of resources within a domain's network. Authorized users of these services, which can be another domain's services, reserve network resources within the domain and associate these resources with specific data flows. When reservations activate across all domains between a flow's source and destination, a dedicated end-to-end virtual path spanning these domains is assembled. This path offers a predetermined level of end-to-end QoS to a specified flow of interest. The coordination of multiple network domains through web services is essentially a loosely coupled service oriented architecture (SOA) for the network control plane or network service plane.

End-to-end virtual paths can be viewed as including three main segments: two end segments, one within each end-site local area network (LAN), and a middle segment spanning one or more wide area network (WAN) domains. TeraPaths establishes end-to-end virtual paths from the perspective of end-sites. User applications run on end-site systems, communicate with the rest of the world through end-site LANs, and are subject to end-site administrative policies. In the standard networking model, traffic through the WAN is subject to pre-existing SLAs between adjacent network domains. In the new advance resource reservation model, such SLAs are essentially dynamic, which allows end-sites to utilize and indirectly manage WAN capabilities in a way that maximizes benefits to the end user.

Once a data path is configured by the virtualization system, the data flows will be routed and switched natively in the physical network data plane. The virtualization system does not use intermediate endpoints to receive and forward data traffic. Rather, the available bandwidth and other quality of service metrics provisioned are exclusively determined by the network data plane. TeraPaths directly interacts with network control planes, while conventional network solutions do not. A set of network device drivers are implemented to allow interaction with the network infrastructure for provisioning.

A framework 10 for establishing end-to-end QoS-aware network paths encompasses web service-based systems that properly configure end-site LAN and WAN domains as shown in FIG. 1. TeraPaths controlled sites 12 are interconnected with WAN MPLS tunnels 14 and/or dynamic circuits 16. Some of the paths pass through regional networks that have long-term static configurations to accommodate QoS. Advance resource reservation can be performed between sites interconnected through the ESnet and Internet2 networks.

One of the technologies used in StorNet concerns the SRM-BeStMan interface. When storing large amounts of data, scientists need to interact with a variety of storage systems, each with different interfaces and security mechanisms, and to pre-allocate storage to ensure that data generation and analysis tasks can take place successfully. To accommodate this need, the concept of storage resource managers (SRMs) was developed.

SRMs are middleware components the function of which is to provide a common access interface, dynamic space allocation, and file management for shared distributed storage systems. The SRM interface is standardized, and the specification led to the development of multiple SRMs that interoperate with each other by various institutions around the world. SRMs are designed to provide support for storage space reservations, flexible storage policies, lifetime control of files to manage space cleanup, and performance estimation. The most recent version of an SRM is referred to as the Berkeley Storage Manager, or BeStMan. BeStMan is designed in a modular fashion so that it can be adapted to different storage systems (such as disk-based systems, mass storage systems, and parallel file systems, such as Lustre) as well as use different transfer protocols (including GSIFTP, FTP, BBFTP, HTTP, and HTTPS). BeStMan is implemented in Java for portability. BeStMan supports basic SRM functions as well as directory management and brokering services for accessing files in the distributed system. BeStMan manages queues of multiple requests to get or put files into spaces it manages. These requests may be for multiple files or entire directories. When managing multiple files, BeStMan can take advantage of the available network bandwidth by scheduling multiple concurrent file transfers.

The StorNet enhancements to BeSTMan include the following: monitoring bandwidth commitments for multiple requests, which include both storage and network bandwidths, as well as backend database support; coordination between source and target BeSTMan's for storage space and bandwidth; providing advanced reservation for future time window comments; and communication and coordination with the underlying TeraPaths system.

A specific use case for BeStMan in "pull" mode is as follows: Target BeStMan is provided with a request (userID (credential, priority), files/directory, maxCompletionTime); Target BeStMan checks if it has any of the files, and allocates them (till maxCompletionTime); Target BeStMan contacts Source BeStMan (get volumeOfRestOfFiles, get sourceMaxBandwidth)→sent, get response; Target BeStMan allocates space (for volume and finds its own T−maxBandwidth; Target BeStMan determines desiredMaxBandwidth=min(T−max-Bandwidth, S−maxBandwidth); Target BeStMan calls local TeraPaths for "reserve and commit" (userID, DesireBeginTime=now, volume, desiredMaxBandwidth, maxCompletionTime); TeraPaths checks validity of UserID, priority, and authorization, negotiates with OSCARS; TeraPaths return (a) (reservationID, reservedBeginTime, reservedEndTime, reservedBandwidth), or (b) "can't do it by maxCompletionTime, but here is new (longer) completion time; and Target BeStMan informs the user (a) "here is your reservation". OK? If yes, no actions; if no, issue cancel reservation to TeraPaths, or (b) "can't do it, do you wish to use extended maxCompletionTime? If not, the reservation is canceled, and, if yes, the reservation is accepted.

Another technology used in StorNet is TeraPaths. In TeraPaths, authentication and authorization is done with X.509 certificates. The TeraPaths testbed uses DOE-issued grid certificates for servers and users. These certificates are used for SSL level mutual authentication, which requires a client to have a keystore, containing the appropriate certificate and key, and a truststore containing the certificate of the server(s) that the client will contact. A client certificate's distinguished name (DN) and certificate authority (CA) need to also be included in the TeraPaths virtual organization (VO), which is checked by end-site TeraPaths instances for authorization.

In view of the above, user information is not necessary to be passed to TeraPaths in a request since it is extracted from a client's certificate. However, separate username and password fields or a single uid field (in which case the id will probably be submitted in a form such as "user=xyz&password=abcd") may be used. Transmission of this information is encrypted since communication is provided over https.

In TeraPaths, processing is synchronous, that is, requests are not queued. Multiple requests may be submitted by multiple clients because typically TeraPaths runs on a multi-threaded application server such as the Sun Java System Application Server (SJSAS). Therefore, the response to a call is essentially a success or failure.

Reserve and commit are distinct operations that are invoked in succession for a complete submission of a request. The result of reserve is a temporary reservation at the end-sites and a standard reservation for the transit domains since OSCARS does not support temporary reservations. The duration of a temporary reservation is typically 60 to 120 seconds, after which the end-site reservations and transit reservations are cancelled. Times are represented as Unix epoch in milliseconds (long integers).

Sources and destinations for traffic can be as fine-grained as a single flow using a specific communication protocol (IP address and port-to-IP address and port, using Transmission Control Protocol (TCP) or User Datagram Protocol (UDP)) or as coarse-grained as lists of Classless Inter-Domain Routing (CIDR) blocks and lists of port ranges, using any Internet protocol. If lists are used, support is available for mapping sources to destinations and making combinations of addresses and ports and combinations of sources and destinations.

TeraPaths combines DiffServ-based LAN QoS with WAN MPLS tunnels and dynamic circuits to establish end-to-end (host-to-host) virtual paths with QoS guarantees. These virtual paths prioritize, protect, and regulate network flows in accordance with site agreements and user requests, and prevent the disruptive effects that conventional network flows can bring to one another.

Figure 2:
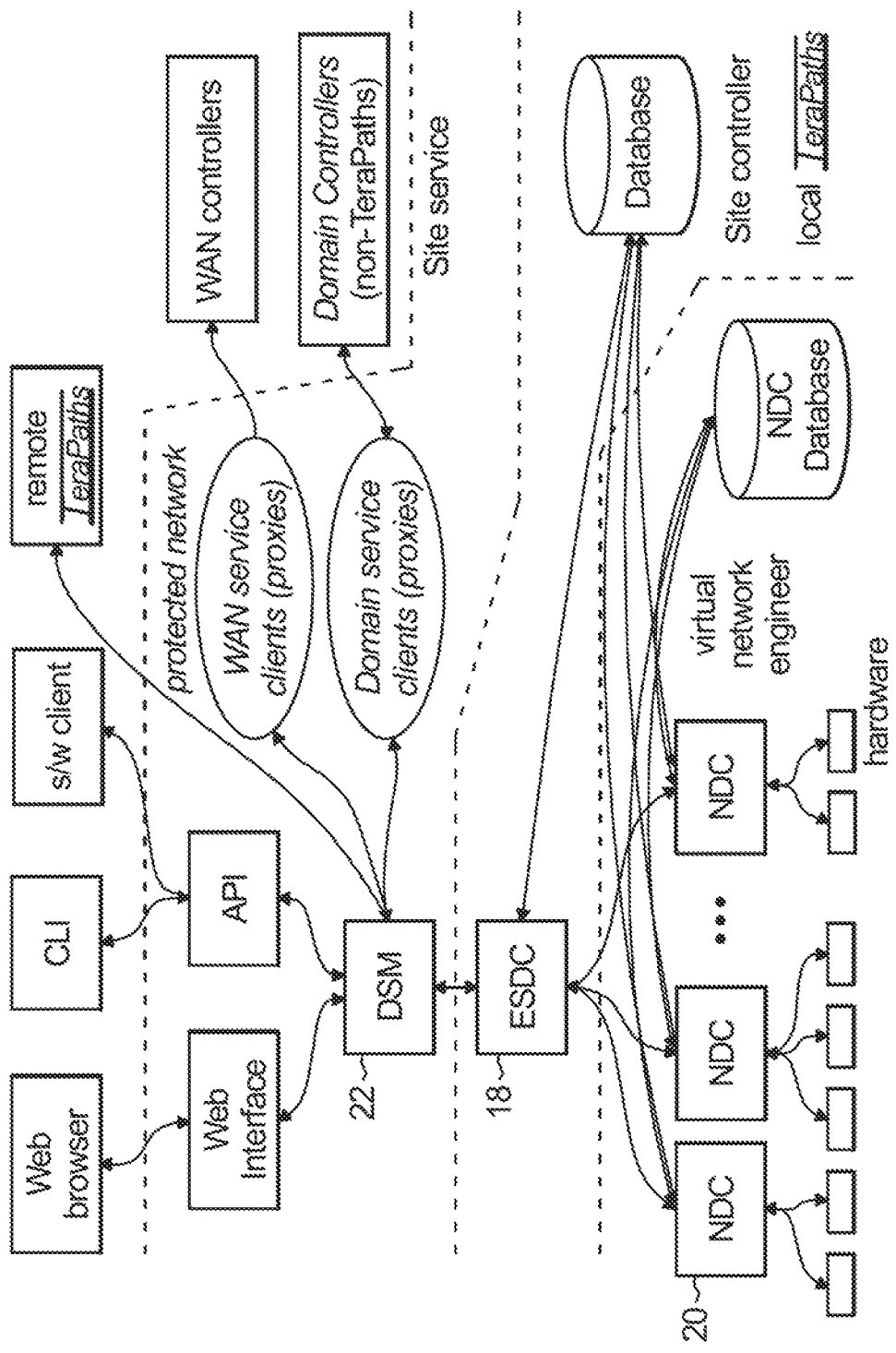
FIG. 2 shows a software architecture associated with TeraPaths, in which services of remote network domains are invoked through proxy server modules.

Providing an end-to-end virtual network path with QoS guarantees, such as guaranteed bandwidth, to a specific data flow uses timely configuration of network devices along the route between a given source and a given destination. In general, such a route passes through multiple administrative domains and there is no single control center able to perform the configuration of all devices involved. TeraPaths has a fully distributed, layered architecture, as shown in FIG. 2, and interacts with the network using a perspective of end-sites of communities. The local network of each participating end-site is under the control of an End-Site Domain Controller module (ESDC) 18. The site's network devices are under the control of one or more Network Device Controller modules (NDCs) 20. NDCs 20 play the role of a virtual network engineer in the sense that NDCs 20 securely expose a very specific set of device configuration commands to the ESDC 18. NDCs 20 can be, if so required by tight security regulations, completely and independently installed, configured, and maintained.

The NDC 20 encapsulates specific functionality of a network device and abstracts this functionality through a uniform interface while hiding the complexity of the actual configuration of heterogeneous hardware from higher software layers. A site's ESDC 18 and NDC(s) 20 are complemented by a Distributed Services Module (DSM) 22, which is the core of TeraPaths. The DSM 22 has the role of coordinating network domains along the route between two end hosts (each host belonging to a different end-site) to timely enable segments and establish an end-to-end path. The DSM 20 interfaces with ESDCs 18 (local and remote) to configure the path, starting within end-site LANs (direct control) and proceeding to the necessary path segments through WAN domains (indirect control). To interface with non-TeraPaths domain controllers, primarily for WAN domains but also for end-sites that may be not be using TeraPaths, the DSM 20 uses auxiliary modules to encapsulate the functionality of the targeted domain controller by invoking the required API but exposing a standardized abstract interface. As such, these auxiliary modules appear to the DSM 20 as a set of proxy WAN or end-site services with a uniform interface. It should be noted that the responsibility of selecting and engineering the path within a WAN domain belongs to the controlling system of that domain. TeraPaths indirectly affects such a path by providing preferences to the WAN controlling system, if that system offers such a capability.

Figure 3A:
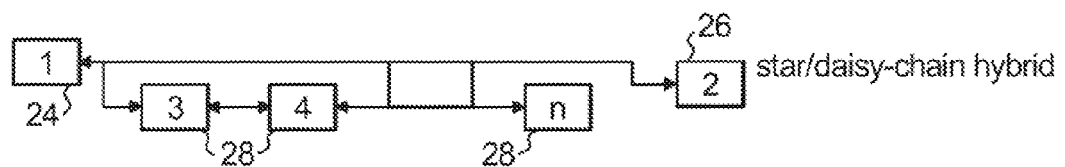
FIGS. 3A-C show hybrid star/daisy-chain, daisy-chain, and star domain coordination models ("star (central control)"), respectively.
Figure 3B:
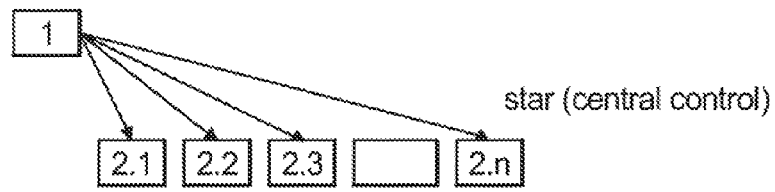
Figure 3C:
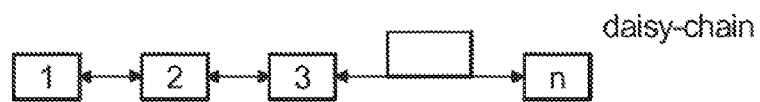

TeraPaths follows a hybrid star/daisy-chain coordination model, shown in FIG. 3A, in which an initiating end-site 24 first coordinates with the target site 26 and then indirectly sets up a WAN path by contacting its primary WAN provider and relying on that provider's domain to coordinate, if necessary, with other WAN domains 28 along the desired route as shown in FIG. 3a. The hybrid coordination model is the most feasible since end-site and WAN systems need only to interface/coordinate. The star configuration shown in FIG. 3b requires extensive information for all domains, and the daisy-chain model shown in FIG. 3c requires common flexible protocol across all domains. Thus, a unified communication protocol is not required, as in the case of the daisy-chain model, and there is no centralization of control, as in the case of the star model. The hybrid model essentially splits the network into two large segments: the end-sites and the WAN domains, with each segment coordinating with the other to setup a path. Thus, the hybrid model advantageously enables use of independent protocols and direct end-site negotiation.

Figure 4:
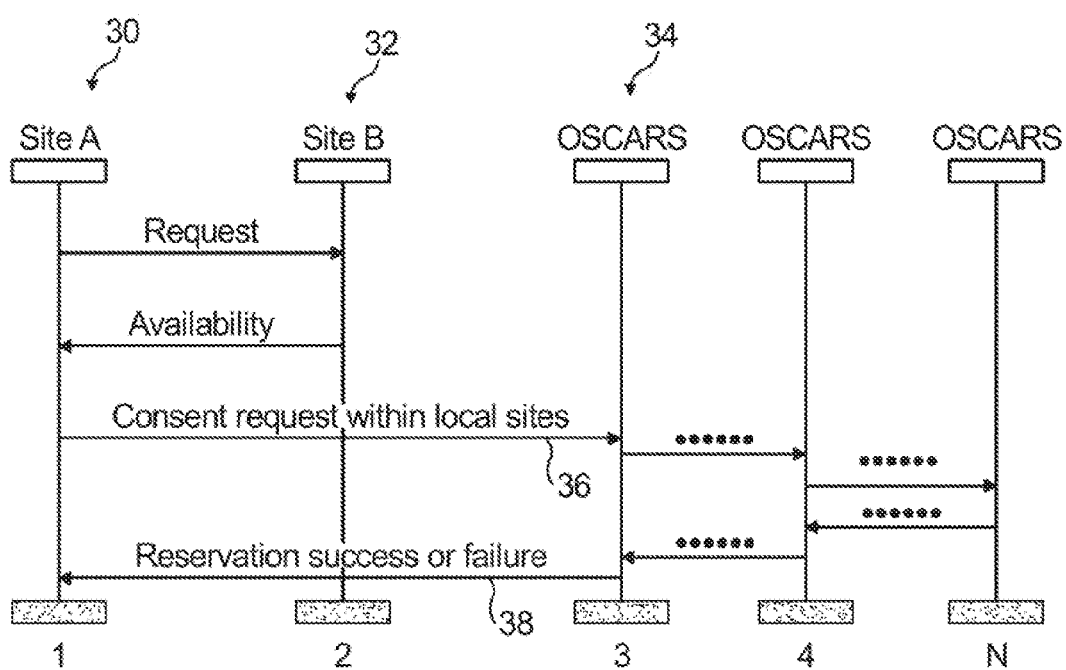
FIG. 4 shows a message sequence chart for the coordination of network domains controlled by OSCARS.

The result of the domain coordination process is the establishment of dynamic service level agreements (SLAs) between network domains along an end-to-end path. TeraPaths is responsible for the two end-sites and OSCARS is responsible for one or more peering WAN domains. A Message Sequence Chart (MSC) shown in FIG. 4 shows the messaging sequence that occurs in the system implementation. Initiating end-site A 30 negotiates with another end-site B 32 to reach a consensus based on the resource availability of both sites. Then, end-site A 30 sends a negotiated request 36 to the WAN domain manager, in this case, OSCARS, which responds with a success or failure message 38.

TeraPaths may receive network bandwidth requests from BeStMan with inputs (volume, max-bandwidth, max-completion-time), and negotiate with OSCARS for the optimal time window, which can be earliest completion time or the shortest transfer time. If the request is successful, an acknowledgement is returned to BeStMan and the reservation is committed if BeStMan desires. If the reservation fails, TeraPaths will search for the closest solution to suggest to BeStMan.

A ReservationData data structure contains all necessary information about a reservation including source and destination addresses and ports, start time and duration, requested bandwidth and QoS class, related WAN reservations identifier, user credentials, and rescheduling criteria. End-to-end paths include multiple segments. The segment of each domain is established by a reservation. Domains agree on parameters and their ranges, and each domain is characterized by a resource availability graph, such as for bandwidth. The availability of domains can be established by calculating the minimum availability graph. Each new reservation has to fit in the available area, and any reservations that do not fit are to be modified. If no modification makes a reservation fit, the reservation is rejected. Start times, end times, and bandwidths may be modified using end-to-end bandwidth availability graphs (BAGs) if applicable or combination of BAGs and trial and error techniques.

Figure 5:
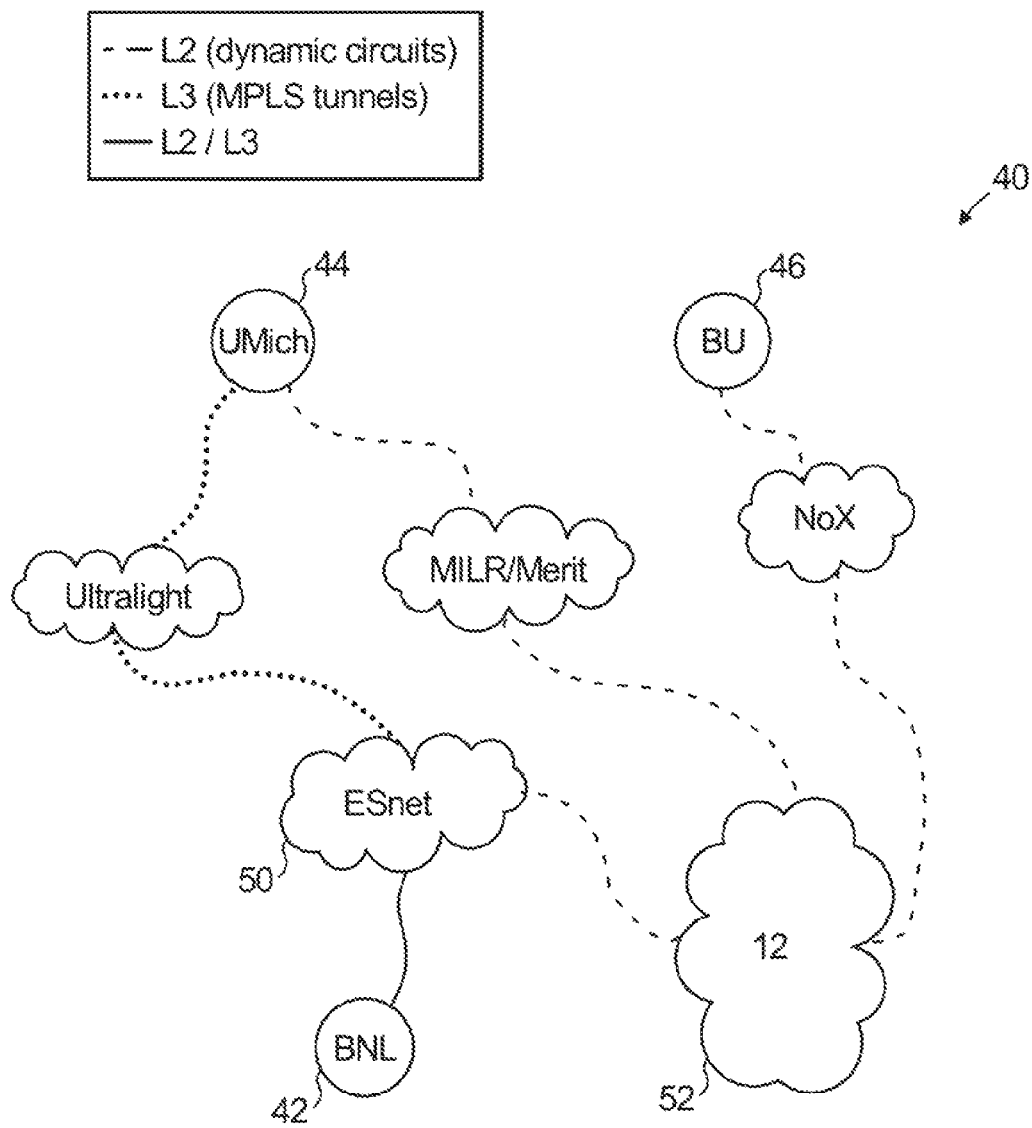
FIG. 5 shows a diagram of an existing TeraPaths testbed.

A multiple-site testbed 40 was used for research, software development, and testing of TeraPaths. The testbed 40 may encompass subnets at three sites: Brookhaven National Laboratory (BNL) 42, University of Michigan (UMich) 44, and Boston University (BU) 46 as shown in FIG. 5. Each site may run its own instance of TeraPaths.

Figure 6:
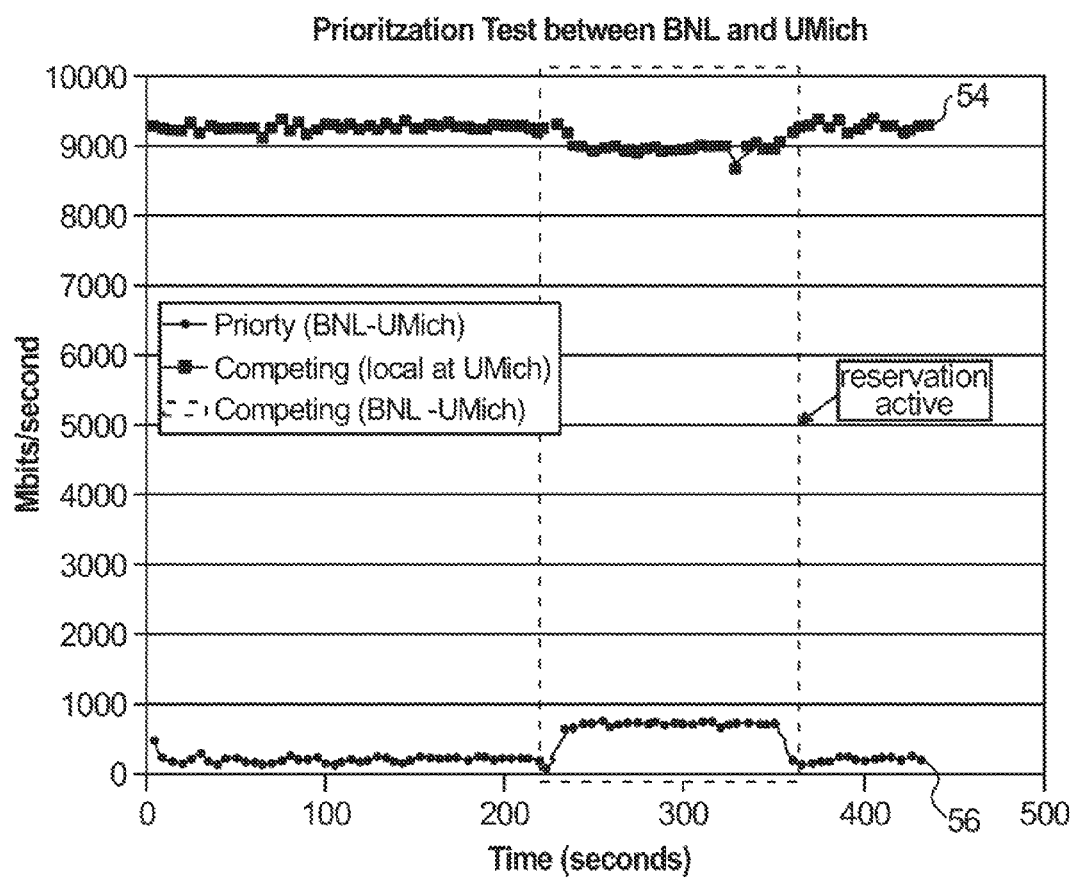
FIG. 6 shows test traffic between sites in the testbed ("Prioritization Test between BNL and UMich") shown in FIG. 5.

The instances can interface with OSCARS interdomain controllers to setup MPLS tunnels through ESnet 50 and dynamic circuits through ESnet 50 and Internet2 52. End-sites can have similar interconnecting capabilities depending on which WAN their subscription supports. For example, ESnet 50 supports both L2 and L3 circuits, while Internet2 52 only supports L2 circuits. FIG. 6 shows the results of traffic tests between BNL 54 and UMich 56. The target host at UMich 56, which is the same for all traffic streams, has a maximum capacity of 10 Gbits/second. Priority traffic between BNL 54 and UMich 56 competes against other intersite traffic and traffic local to UMich 56. The desired rate of the priority traffic is 700 Mbits/second, which is achieved when a TeraPaths reservation is active. The rate of competing traffic drops by approximately 500 Mbits/second, which is used by the priority traffic for the duration of the reservation.

Figure 7:
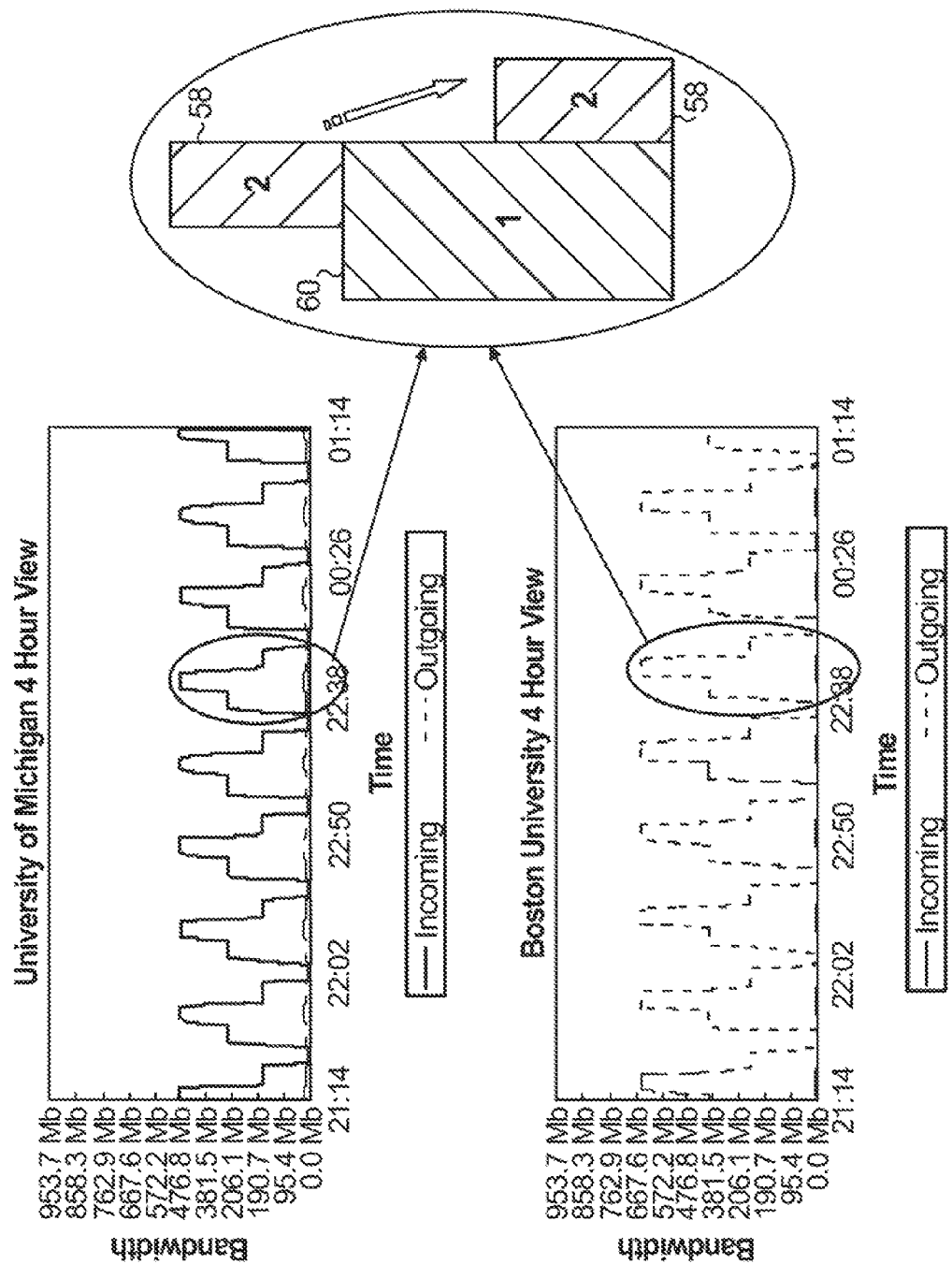
FIG. 7 demonstrates flow bandwidth regulation in a plot of bandwidth v. time.

TeraPaths instances can regulate and guarantee bandwidth for multiple flows between the testbed sites. These flows may utilize individual WAN circuits or may be grouped together, based on their source and destination, into the same WAN circuit that accommodates the aggregate bandwidth. FIG. 7 demonstrates flow bandwidth regulation for multiple periodic data transfers monitored by the Internet2 perfSONAR system. The aggregate bandwidth passing through circuits between BNL, UMich, and BU is displayed. Two transfers take place during each period, with each transfer maintained at a guaranteed bandwidth level. The second transfer (2) 58 starts later than the first (1) 60 and continues after the latter finishes. The flows are policed (rate-enforced) to guaranteed bandwidth levels preventing competition within the circuit. Use of DiffServ QoS in the end-site LANs and dynamic WAN circuits ensures that presence of other traffic does not affect the regulated flows. In the particular example shown in FIG. 7, transfer (2) 58 is policed even after transfer (1) 60 is over. In general, it is possible to alter policing rules to allow the continuing transfer to optimize use of the circuit bandwidth. The QoS guarantee provided by TeraPaths and OSCARS is at the network device level, that is, network devices are configured to recognize specific packet flows and offer these packet flows a different level of service as determined by the coordinated system reservations. The quality of the guarantee depends on the implementation (DiffServ, MPLS, and GMPLS) technologies in the network devices along a path. For the end-sites where DiffServ is used, the highest level of guarantee is achieved when utilizing the expedite forward (EF) class of service, since traffic belonging to this class is typically serviced by strict priority queuing schemes.

Figure 8A:
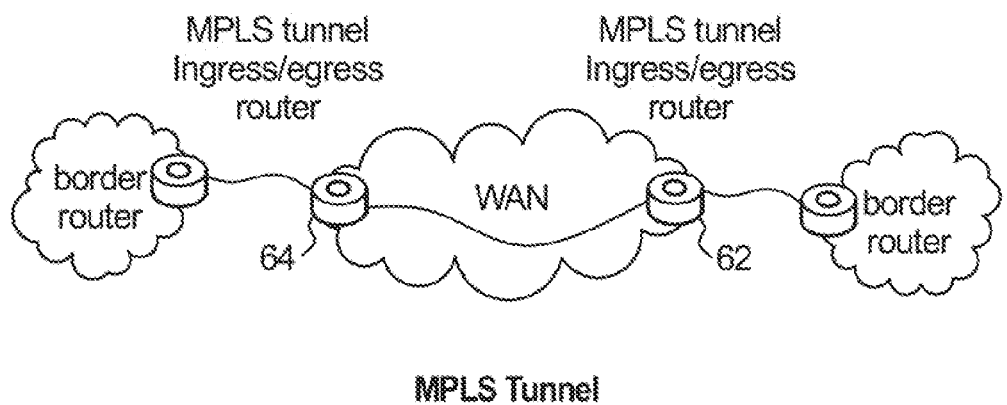
FIG. 8A shows an end-to-end circuit implemented across a WAN as an MPLS tunnel.

From the perspective of end-sites, the requirements for utilizing a layer 2 (L2) or layer 3 (L3) circuit are significantly different. If the path through one or more WAN domains is established in the form of an MPLS tunnel as shown in FIG. 8a, admission control into the tunnel is done at the ingress device 62, 64 of the MPLS tunnel on the WAN side. Packets that belong to an authorized flow or group of flows are recognized based on their source and destination IP address and possibly additional selection criteria, such as port numbers. The source end-site transfers packets to the WAN, but only those that belong to authorized flows enter the WAN's corresponding tunnel. The MPLS tunnel maintains the packet DSCP markings so that flows emerging at the egress 62, 64 of the tunnel receive differential treatment within the destination end-site LAN. The MPLS tunnel starts and ends within the WAN domain. Packets are admitted into the tunnel based on flow ID information (IPsrc, portsrc, IPdst, portdst). WAN admission is performed at the first router of the tunnel (ingress).

Figure 8B:
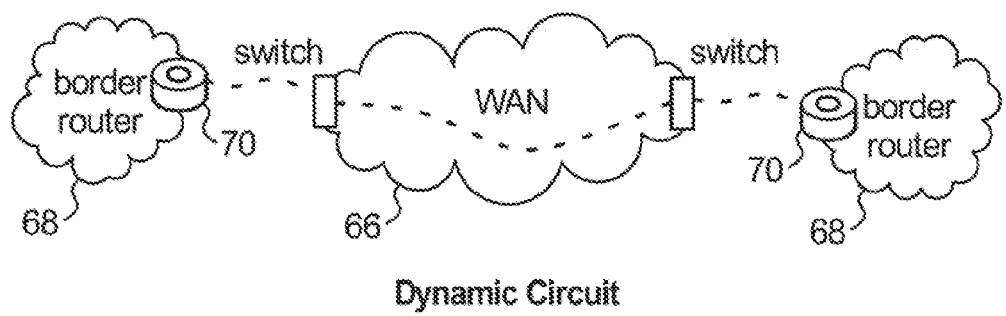
FIG. 8B shows an end-to-end circuit implemented across a WAN as an L2 dynamic circuit.

The infrastructure for utilization of dynamic L2 circuits is quite different as shown in FIG. 8b. In this case, the WAN circuit 66 established between two end-sites 68 makes those sites members of the same Virtual LAN (VLAN). The interfaces of the end-site border routers 70 participating in the connection appear as if connected directly with a patch cable. That is, there appears to be a single hop between the end-sites. Forwarding authorized traffic to the VLAN assigned to the circuit is the responsibility of the end-site's border router 70. The border router uses policy-based routing (PBR) to selectively forward authorized flow packets, which are identified by source and destination IP addresses and possibly other criteria, such as ports, into this VLAN. For bidirectional traffic through a circuit, the border routers 70 are configured in a mirrored configuration so that the border router 70 at the destination site appears as the next hop to the border router 70 of the source site and vice versa.

Figure 9:
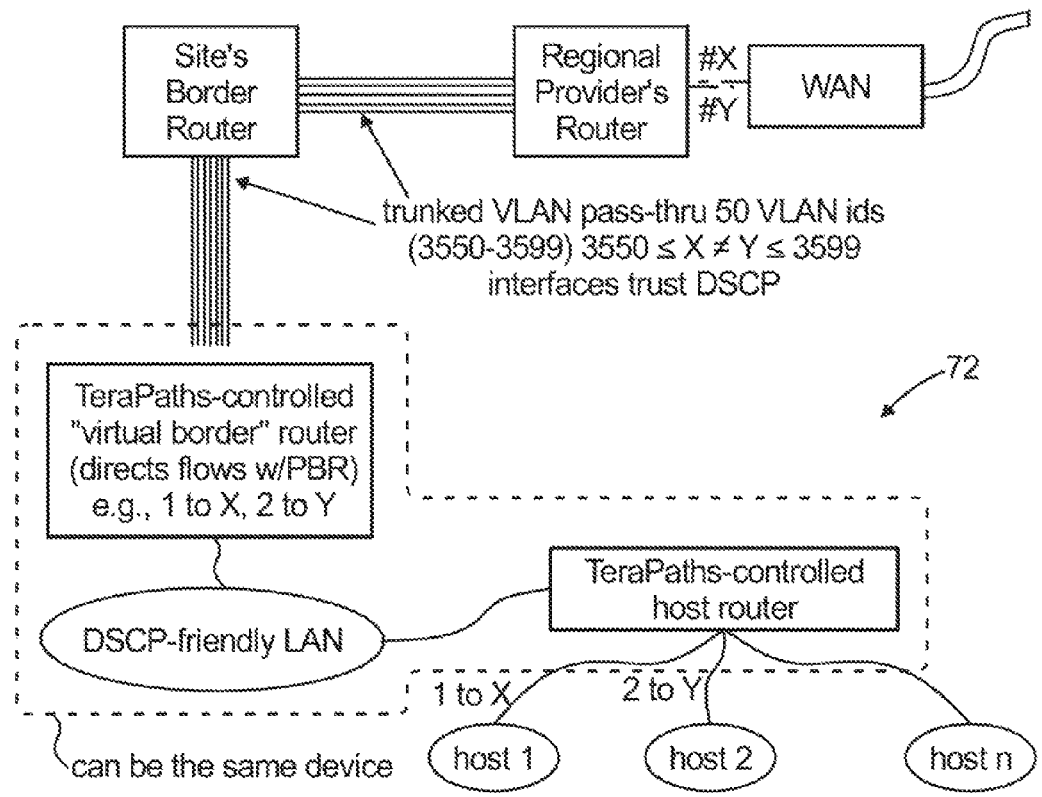
FIG. 9 shows an example of a TeraPaths controlled pass-through setup.

When an end-site gains access to a WAN domain through a regional network (RN) that cannot be dynamically configured through a domain controller, the RN's devices are statically configured so that (a) DSCP markings are not reset at the boundaries and (b) VLANs are extended through the RN. The same technique is used within an end-site LAN for network devices that are along routes used by end-to-end paths but are not under direct TeraPaths control. The static configuration is applied to those specific device interfaces that interconnect TeraPaths-controlled devices with WAN devices. Such statically configured network segments are referred to herein as pass-through segments, in the sense that they honor differentiated services code point (DSCP) markings and allow extension of VLANs through them. FIG. 9 shows an example of a pass-through configuration for the end-site regional network and border router. The router where circuit VLANs terminate functions as a virtual border router. If only one router is controlled by TeraPaths, this router both conditions and forwards authorized traffic.

In both L2 and L3 circuit cases, scalability issues are considered since both technologies require involved network devices to be configured to recognize specific data flows. Both multi-protocol label switching (MPLS) tunnels and dynamic circuits are technologies well suited to establish special connections between WAN endpoints and accommodate qualifying traffic between sites connected to these endpoints. However, dedicating an MPLS tunnel or a dynamic circuit to each individual flow between a pair of end-sites may cause severe scalability problems, especially in the case of dynamic circuits. With MPLS tunnels, scalability depends on the limitations and efficiency of the WAN hardware, while reserved bandwidth is allocated only when qualifying flows are present. MPLS tunnels are unidirectional. Thus, bidirectional flows use two separate WAN reservations, one for each direction. With L2 dynamic circuits, additional restrictions apply. Since a circuit behaves like an Ethernet-based VLAN, the same VLAN ID is used along the entire route covered by the circuit. Network devices along the path use the same VLAN ID. This is a severe restriction since current devices support a total of roughly 4,000 tags with several tag ranges reserved for device use and administrative purposes. Therefore, only a small fraction of the overall tag range is actually available for utilizing dynamic circuits. Further, each domain may have its own tag subset. The establishment and utilization of a circuit between two end-sites requires domains along the path to have a common subset of tags. In TeraPaths, this is utilized so that no tag conflicts arise when setting up a circuit. This requirement may be relaxed by exploiting VLAN renaming capabilities.

In the TeraPaths testbed, there is an agreement that 50 VLAN tags, 3550-3599, are reserved for dynamic circuit use. This ensures that no tag conflicts exist within the testbed because all testbed sites are serviced by ESnet and Internet2, which form a composite domain that can be configured by contacting a single OSCARS instance. Thus, it is possible to rely on OSCARS to select an available VLAN ID within a range suitable for the end-sites involved.

The limitation in the number of available VLAN IDs, and the additional property of circuits to reserve bandwidth regardless of the presence of qualifying traffic and to be bidirectional emphasize the need to treat L2 dynamic circuits as a costly resource requiring sophisticated techniques to maximize utilization efficiency. Clearly, such circuits are to be viewed as highways between end-sites. Flows with matching sources and destinations are to be grouped together and forwarded through common circuits configured to accommodate the aggregate bandwidth of the grouped flows.

Grouping individual data flows or flow groups with common sources and destinations together and forwarding them to a common WAN circuit with enough total bandwidth and duration to accommodate all flows can drastically reduce the number of circuits that are needed between a pair of end-sites simultaneously, as well as increasing the availability of the dedicated paths. The first step of this approach is to decouple the end-site reservations from the WAN reservations. End-sites still reserve resources for individual flows. However, multiple end-site reservations can be accommodated by a single WAN circuit reservation as long as the aggregate duration and bandwidth can be determined. The level of reservation consolidation (or unification) is to be controlled by suitable criteria to minimize the waste of resources.

Figure 10:
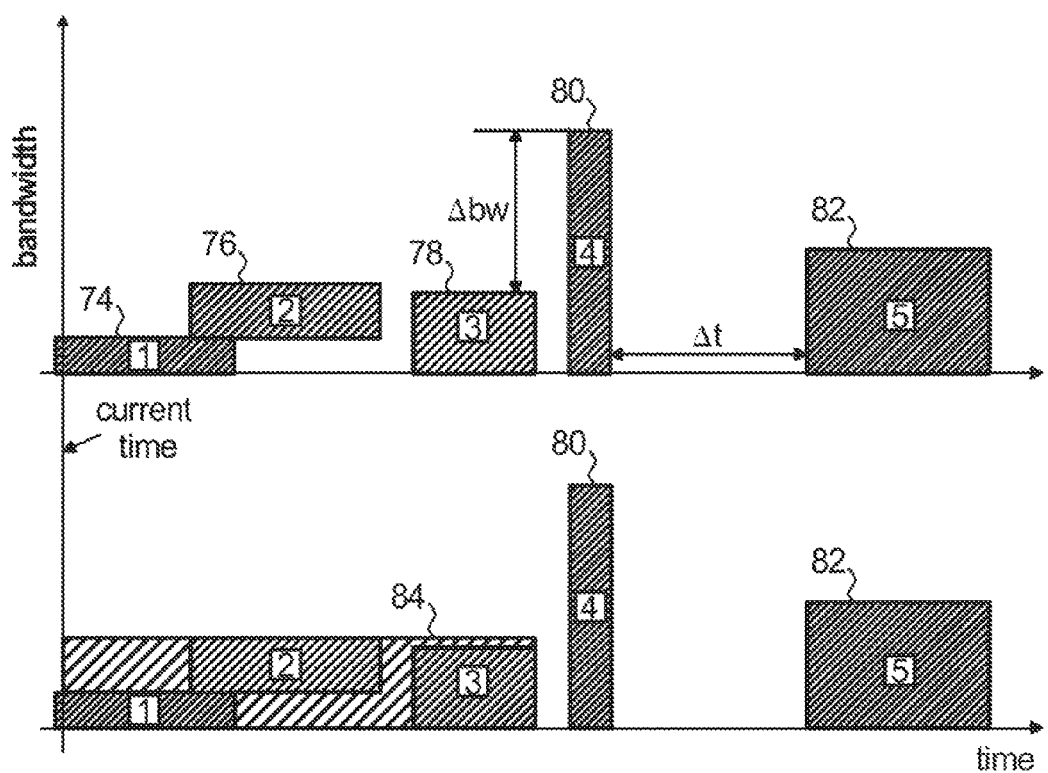
FIG. 10 shows an example of a reservation consolidation in a plot of bandwidth v. time.

FIG. 10 shows an example of such criteria. If all reservations #1 through #5, 74, 76, 78, 80 and 82 respectively, are to be associated with a single encompassing WAN reservation, the resource waste would be significant due to the short but high-bandwidth reservation #4 80 and the distance time between reservations #4 80 and #5 82. Therefore, limits in the maximum difference in bandwidth between reservations Δbw and the time period between the end of one reservation and the beginning of the next reservation Δt are taken into account when selecting which reservations are to be consolidated. In the example shown, unifying reservations #1, #2, and #3 74-78 is feasible as reservation 84, while reservation #4 80 has too large a Δbw, and reservation #5 82 is too far in the future (that is, the associated Δt is too large).

The initiating ESDC should handle the WAN reservations and the configuration of both end-sites. Although basic WAN reservation primitives may be used for consolidating reservations, additional primitives may be necessary to streamline the process and make it effective. Using basic primitives, the ESDC can create a new WAN reservation, which requires that at least one VLAN ID be available for a dynamic L2 circuit, to accommodate a newly arrived reservation that fulfills the criteria to use a specific circuit. If the circuit is pending, the consolidated WAN reservations may be immediately cancelled. However, if the circuit is already active, all relevant traffic must be switched to the new VLAN before cancelling the WAN reservations. With L3 circuits, this switching is not necessary. Using this technique, the submission of a new WAN reservation may fail due to a lack of available bandwidth occupied by reservations that will be cancelled. A new WAN primitive allows the submission of a reservation while taking into account simultaneous cancellation of a set of existing reservations, which would greatly increase the efficiency of this technique.

If the WAN domain controller allows modification of its reservations to a certain degree, it is possible to extend a reservation time-wise and/or to modify its bandwidth. While time-wise modifications are straightforward and contingent on resource availability, bandwidth modifications need to be considered not only with regard to when they should take place within active or pending reservations, but also with regard to what the repercussions will be for existing connections through an active circuit that may be interrupted during reconfiguration.

Two optimization and consolidation techniques for WAN reservations will now be discussed. WAN reservations are initially assumed to correspond 1-to-1 with end-site reservations. However, committing a reservation and deactivating a reservation are events that trigger an optimization and consolidation phase for the WAN reservations. In both of these cases, active or pending reservations within a specific time period before the beginning and/or after the end of a new reservation may be selected for consolidation. The goals are to maximize utilization of the disk and increase the speed of access by buffering as much data as possible with read operations and before write operations. Selecting WAN reservations based on optimization criteria, such as minimizing waste of resources, and consolidating reservations maximizes utilization of a circuit and reduces the number of expensive create and teardown operations. Thus, these two techniques will be referred to herein as "create ahead" and "teardown behind."

Figure 11:
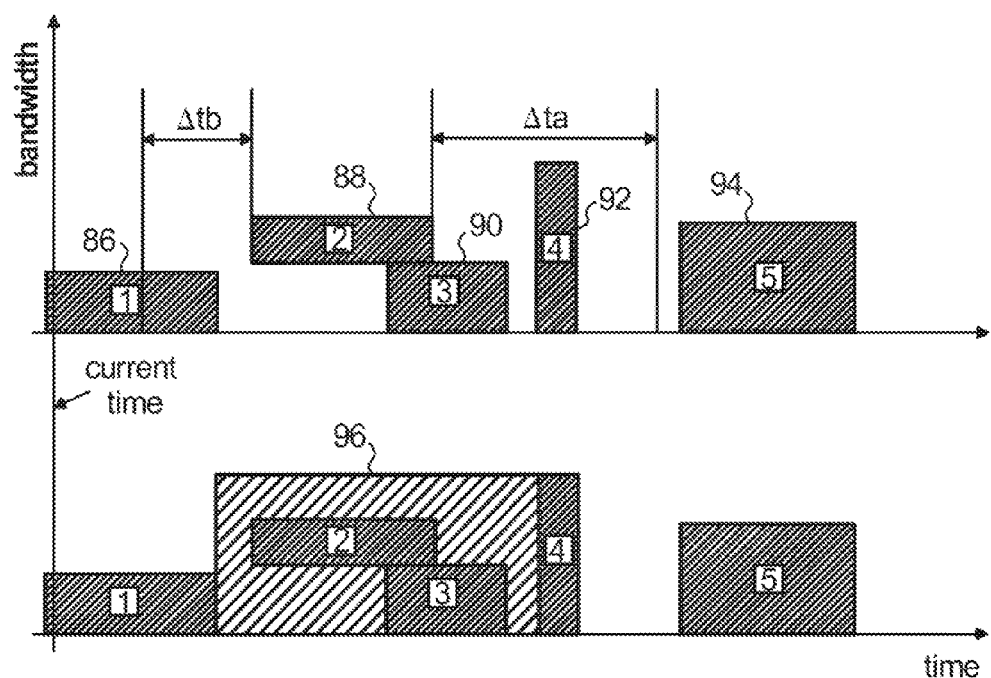
FIG. 11 shows an example of a look-ahead technique in a plot of bandwidth v. time.

FIG. 11 shows an example of the create-ahead (or look-ahead) technique, which selects WAN reservations within $\Delta t_b$ before the start of a new reservation and $\Delta t_a$ after the end of a new reservation for consolidation if additional limits in bandwidth differences and time distance are met. In the example shown in FIG. 11, reservation #2 88 is new and the circuit corresponding to reservation #1 86 is modified to accommodate reservations #2, #3, and #4 88-92 with a single reservation 96. Reservation #5 94 is too distant to be consolidated.

Figure 12:
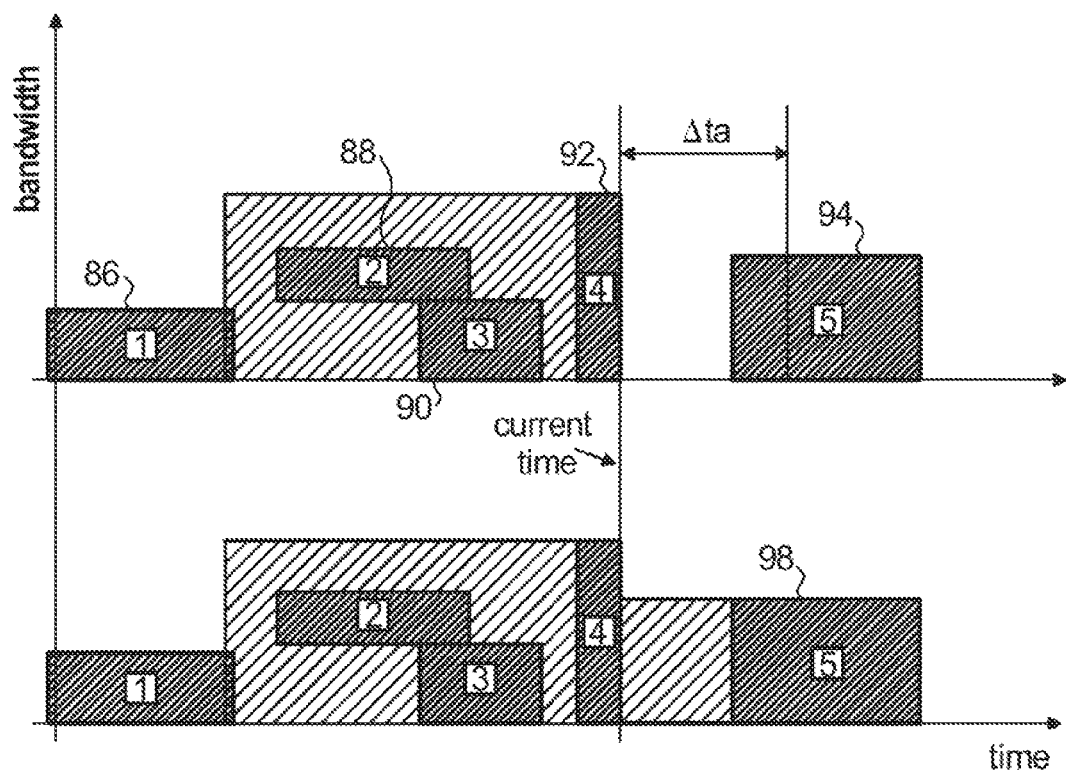
FIG. 12 shows an example of a teardown behind technique in a plot of bandwidth v. time.

To minimize the waste of resources, the second technique, teardown behind, as shown in FIG. 12, modifies a unified reservation to conform to the bandwidth requirements at the time when the corresponding end-site reservation expires by consolidating WAN reservations within $\Delta t_a$ after the expiration of the end-site reservation. The net result of combining the two techniques is to reduce the number of required circuits and the frequency of circuit creation and teardown operations for circuits between the same end-sites while also reducing the waste of WAN resources. In the example shown in FIG. 12, when reservation #4 92 expires, the circuit servicing reservations #2, #3, and #4 88-92 is not torn down, but is instead modified to accommodate reservation #5 94 in a new reservation 98.

The reservation consolidation problem and an algorithm to apply the above techniques to minimize the request blocking rate are discussed below. Both the offline case, in which a set of reservation requests are given in a batch, and the online case, in which a new request is serviced with possible reconfiguration of existing reservations, are considered. Extensive simulation results show the tradeoff between bandwidth utilization and VLAN ID utilization.

An advance reservation request may be represented by a 3-tuple $r_j = (r_i^s, r_i^e, r_i^b)$, which requests a reservation with bandwidth $r_i^b$ within an active window $(r_i^s, r_i^e)$, wherein $r_i^s$ is a future starting time. The volume of a request is calculated as $r^v = r^b(r_i^e - r_i^s)$. The goal is, when given a request or a set of requests, to find the most cost-effective method of allocating bandwidth for the circuit and map requests to that circuit. In the model discussed, a circuit is established with a constant bandwidth during its life since bandwidth-varying circuit reservations are not supported in the WAN. However, more than one reservation may be consolidated at the end-site that can then be carried on one circuit. This flexibility intuitively leads to two benefits: saving VLAN IDs and reducing the number of tear-down and setup operations. These two benefits are important since the number of VLAN IDs may be very limited in practice and the tear-down and setup operations can be costly. The disadvantage of consolidating reservations with different bandwidth requests and active windows is that not all reserved bandwidth is used for the actual data transfer during certain intervals, which results in lower resource utilization. The tradeoffs between bandwidth utilization and circuit management efficiency are discussed below.

Bandwidth allocation and circuit assignment (BACA) concerns the problem of how to, given a set R of requests $r_i$, $i \in \{1, 2, \ldots, m\}$, allocate bandwidths and assign requests to circuits such that the maximum number of requests can be satisfied is now discussed. In this way, the service provider can accommodate as many requests as possible to achieve high availability.

More specifically, decisions are made concerning 1) the bandwidth allocation and active duration $(c_j^s, c_j^e)$ for the circuits $c_j$, $j \in \{1, 2, \ldots, n\}$, and 2) the assignment of reservations to circuits $x_{ij}$, $i \in \{1, 2, \ldots, m\}$, $j \in \{1, 2, \ldots n\}$. The objective is to satisfy as many requests as possible while observing the following constraints: the reservation is assigned to a circuit; the total bandwidth used at any time is bounded by a given capacity C; if a reservation is assigned to a circuit, its active window is within the active window of that circuit; within one circuit, the maximum simultaneous data transmission rate is bounded by the bandwidth allocated for that circuit; the bandwidth utilization in each circuit is higher than a given value $\beta$; and the number of available VLAN IDs is constrained by a given value. That is, the number of circuits that are simultaneously active cannot exceed a specific limit, $n \leq N_{max}$. An efficient heuristic for the BACA problem will next be discussed.

Figure 13A:
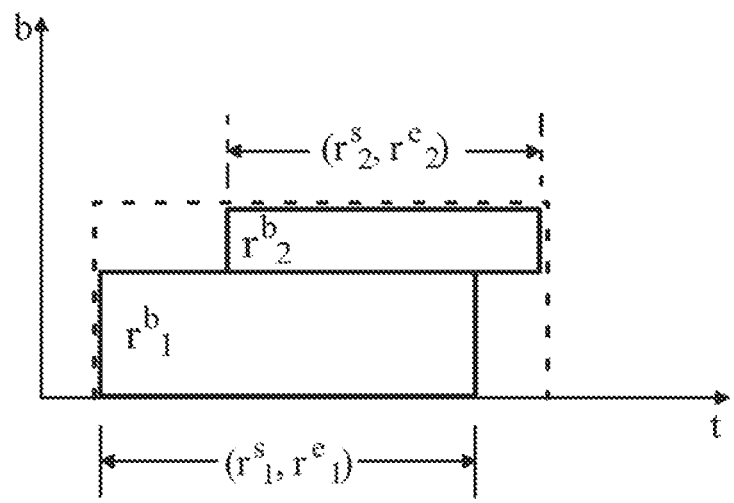
FIGS. 13A-B show examples of a reservation consolidation in a plot of bandwidth v. time.
Figure 13B:
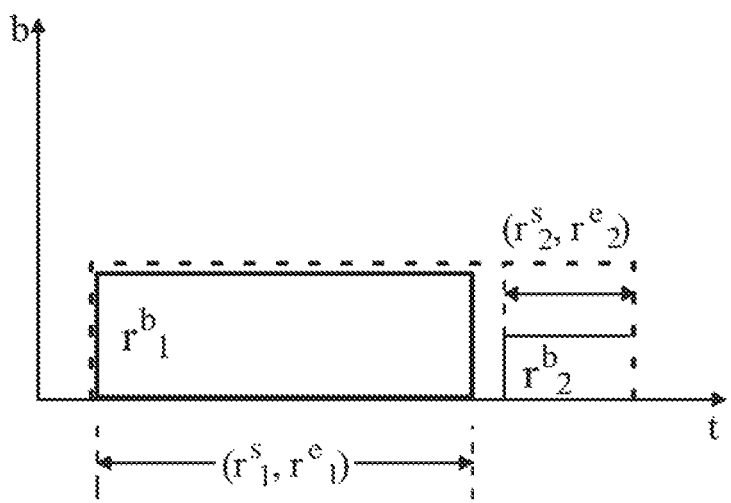

First, requests are ordered by their start times such that $r_i^s < r_j^s$, $i < j$. Second, if two reservations are not overlapping but are close enough to justify consolidation against additional tear-down and setup operations, they are considered to be overlapping, which makes these reservations subject to consolidation as well. Two reservations are considered "close enough" when $|r_i^e - r_j^s| \leq \Delta T$ with $r_i$ starting before $r_j$ and $\Delta T$ the chosen acceptable time gap. Admission control is then performed as no request can have bandwidth larger than C: if $r_i^b > C$, the request is rejected (and removed) by setting $x_{ij} = 0$, $\forall j \in \{1, 2, \ldots, n\}$. Before describing the heuristic, the following terms are defined. One-to-one assignments allocate a circuit c for a request r by setting $c^b = r^b$, $c^s = r^s$, $c^e = r^e$ and setting $x_{rc} = 1$. Consolidating two reservations $r_1$ and $r_2$ results in a reservation r with $r^s = \min(r_1^s, r_2^s)$, $r^e = \max(r_1^e, r_2^e)$, and $r^b = (r_1^b + r_2^b)$ when the two reservations are overlapping, which is shown in FIG. 13(A) where the x-axis is time t and y-axis is bandwidth b, or $r^b = \max(r_1^b, r_2^b)$ if the two reservations are not overlapping but very close, as shown in FIG. 13 (B). Minimum bandwidth utilization is guaranteed if the condition $$r^v \leq \frac{1}{\beta}[r_1^b(r_1^e - r_1^s) + r_2^b(r_2^e - r_2^s)]$$

is satisfied.

The algorithm shown in FIG. 14 can be adapted for use with an online case, in which a new request is serviced without information concerning future reservation requests. More specifically, given a new request, adjacent reservations are retrieved within a predefined optimization window to form a set of reservations R (including the newly arrived reservation) for re-optimization. The algorithm in FIG. 14 can then be used to reconfigure existing reservations to maximize the number of satisfied reservations. However, if the reconfiguration rejects existing reservations, r will be rejected instead. That is, when the reconfiguration can reserve all requests in R, the new configurations are committed in the reservation table. In addition, those reservations in R that have already been in effect will not be reconfigured. However, information concerning reservations in R is needed in the re-optimization to obtain the current bandwidth and VLAN ID usage, i.e., to keep track of how much bandwidth is free (out of C) and how many VLAN IDs are available (out of $N_{max}$). In general, if a higher bandwidth utilization $\beta$ is required when bandwidth allocation and circuit assignment are optimized using reservation consolidation, more VLAN IDs will be used. In the extreme case when $\beta = 100\%$, each reservation uses a unique VLAN ID. In this way, bandwidth waste is minimized in each circuit as shown in FIG. 12 so that the total capacity consumption is reduced. The qualitative analysis above is summarized in Table 1 as follows.

TABLE 1

| Bandwidth utilization β in one circuit | VLAN ID Consumption | Capacity Consumption |
|---|---|---|
| high | high | Low |
| low | low | High |

In the following, given the relative magnitude of available number of VLAN IDs and available capacity, simulations are performed to obtain the bandwidth utilization β that leads to the lowest job blocking rate, which is desirable.

A large number of come-and-go jobs, which is the online case, were simulated and the proposed BACA algorithm were evaluated under a variety of cases. To facilitate presentation, a ratio $r_{cb}$ is defined, which is used to govern the magnitude of the average bandwidth of requests compared to the total capacity and traffic intensity. The traffic intensity is defined to be the product of average request arrival rate and average reservation duration. In the simulation, $r_{cb}$ is used to generate various jobs with different average bandwidth requests as follows:

$$\text{Average bandwidth} = \frac{\text{total capacity}}{(\text{traffic intensity} \times r_{cb})} \quad (1)$$

Figure 15:
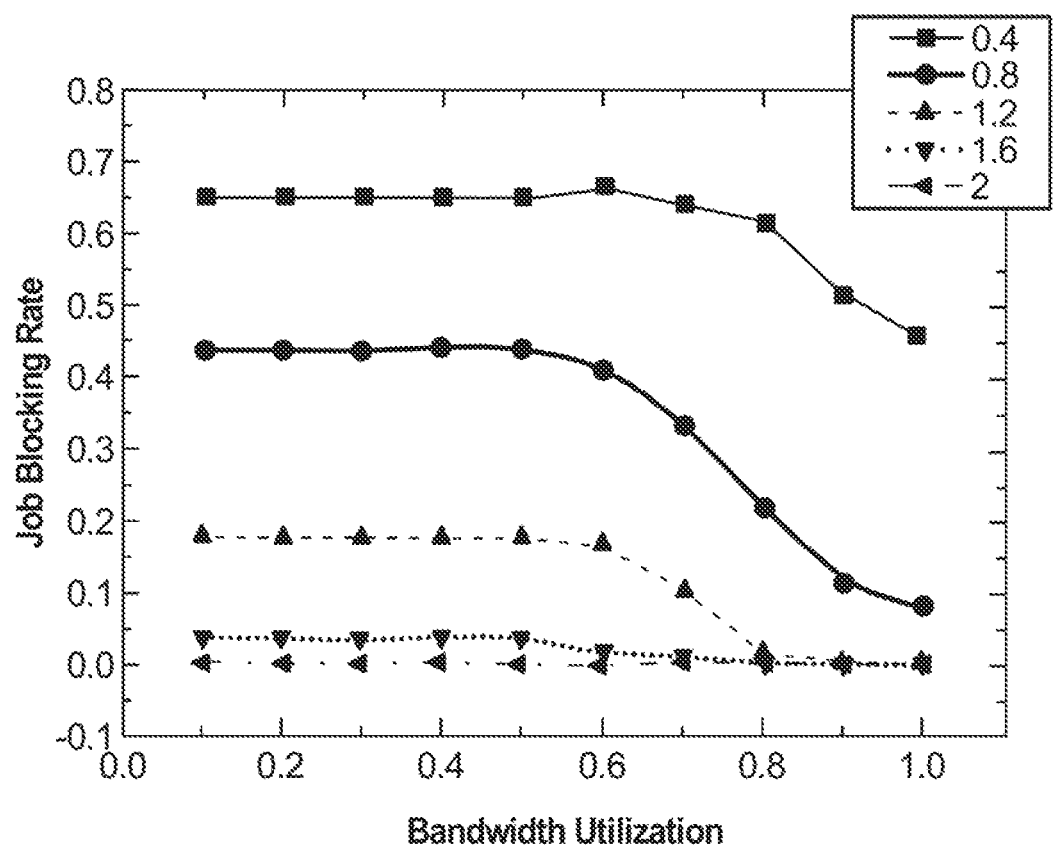
FIGS. 15-18 show simulation results of the BACA algorithm in various cases in a plot of job blocking rate v. bandwidth utilization.

In Case 1, sufficient VLAN IDs and varying bandwidth requests are tested. As shown in FIG. 15 (assuming 10 VLAN IDs and varying $r_{cb}$) higher bandwidth utilization leads to a lower blocking rate. Therefore, reservation consolidation wastes bandwidth and results in a higher blocking rate when bandwidth resources are scarce. More than ten VLAN IDs will not make a significant difference. Thus, ten IDs are considered sufficient.

Figure 16:
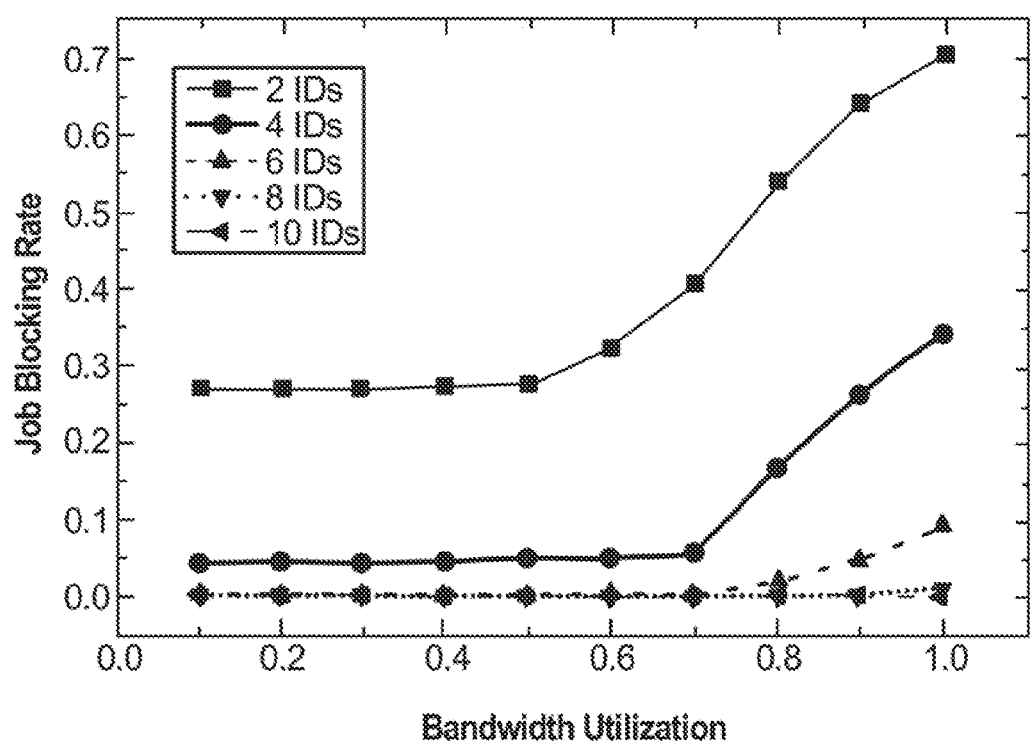
Figure 17A:
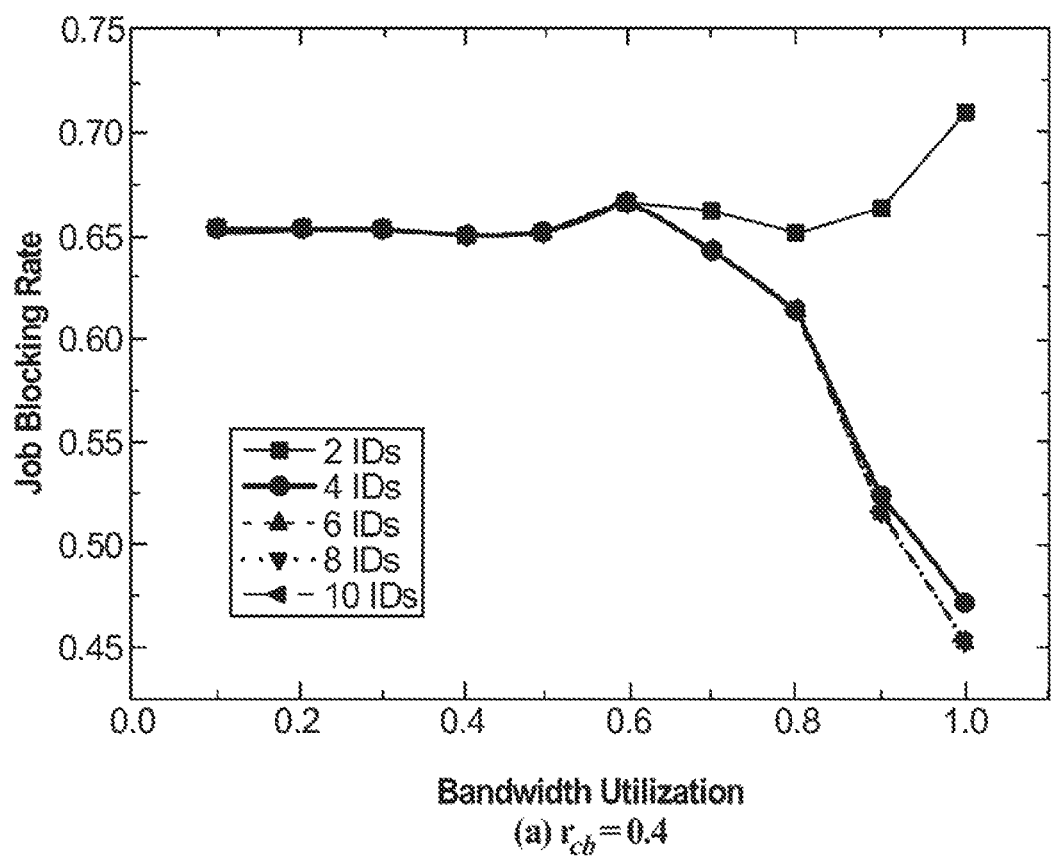
Figure 17B:
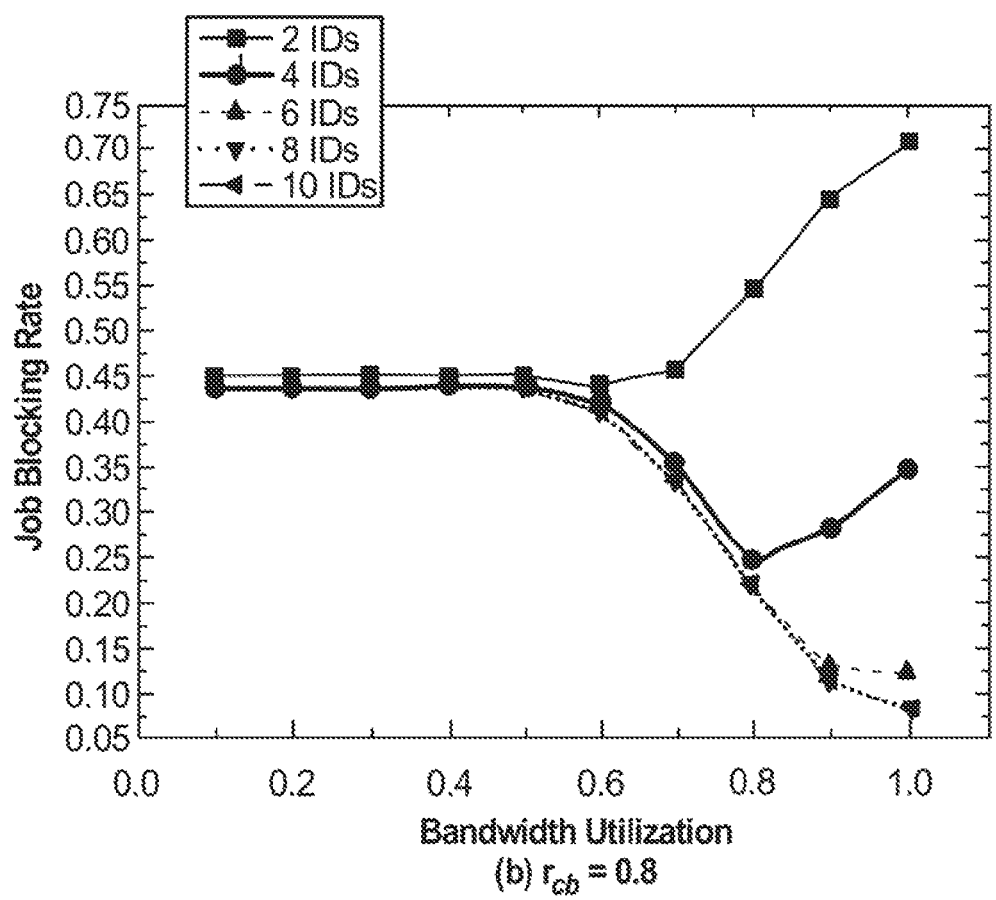
Figure 17C:
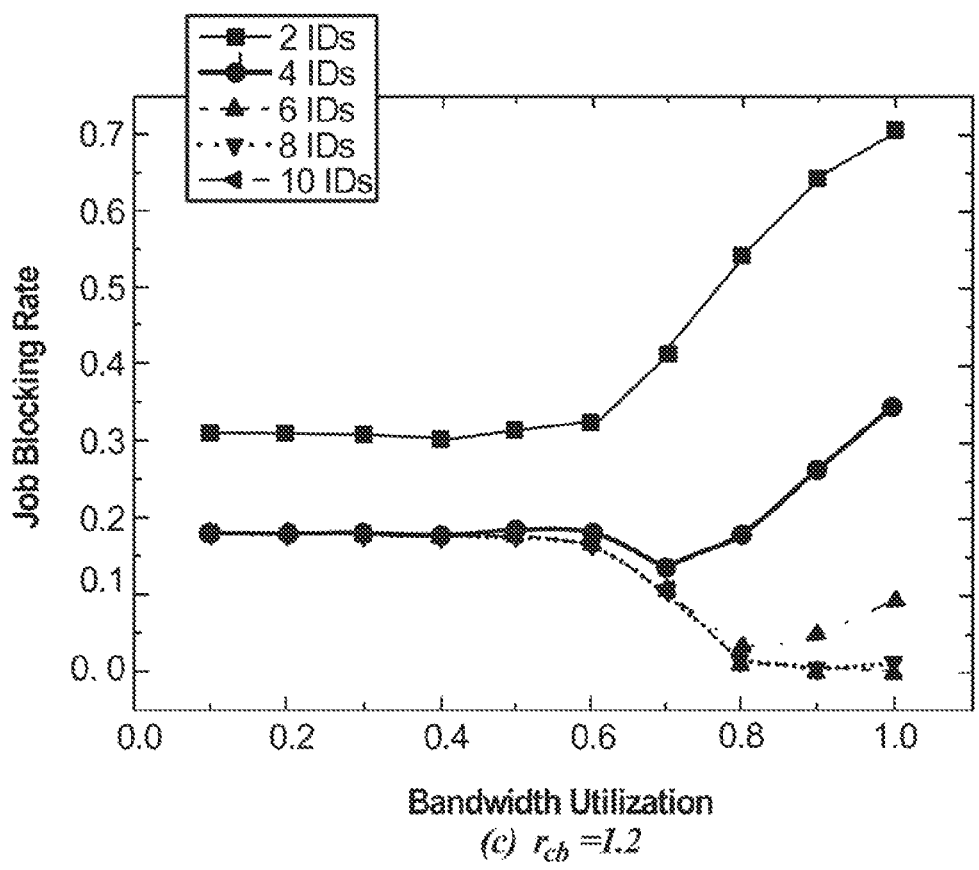
Figure 17D:
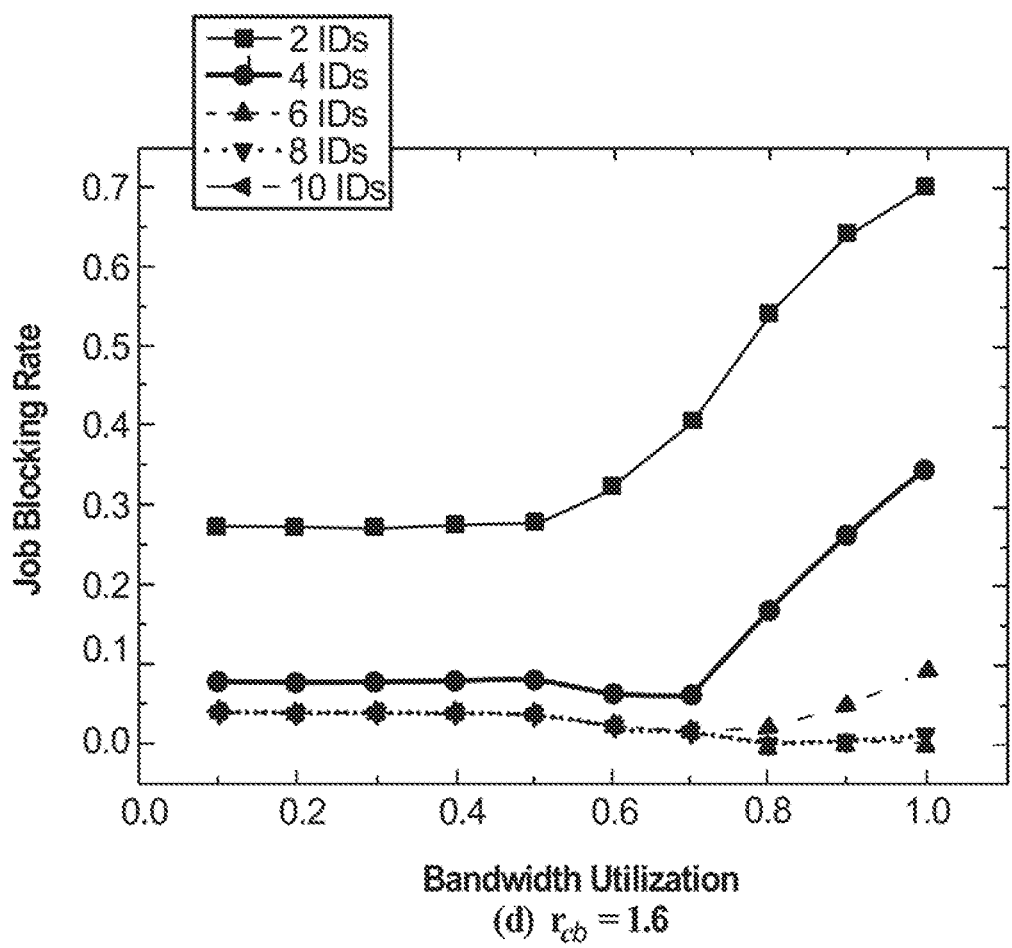
Figure 18A:
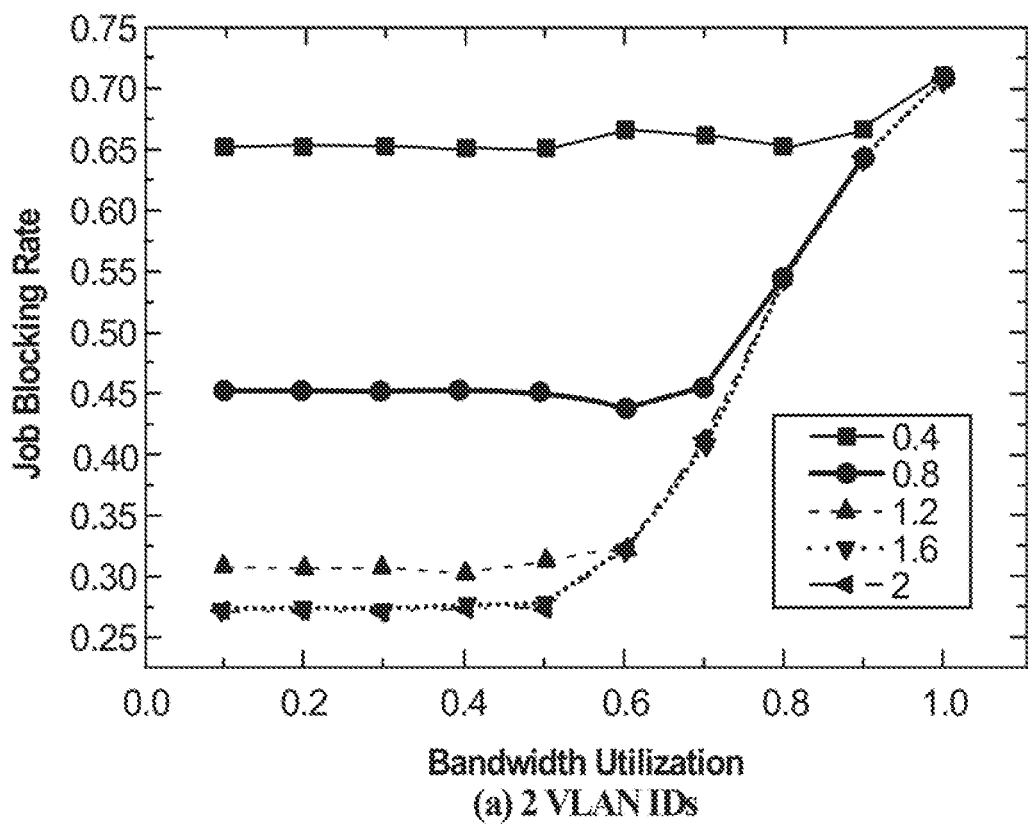
Figure 18B:
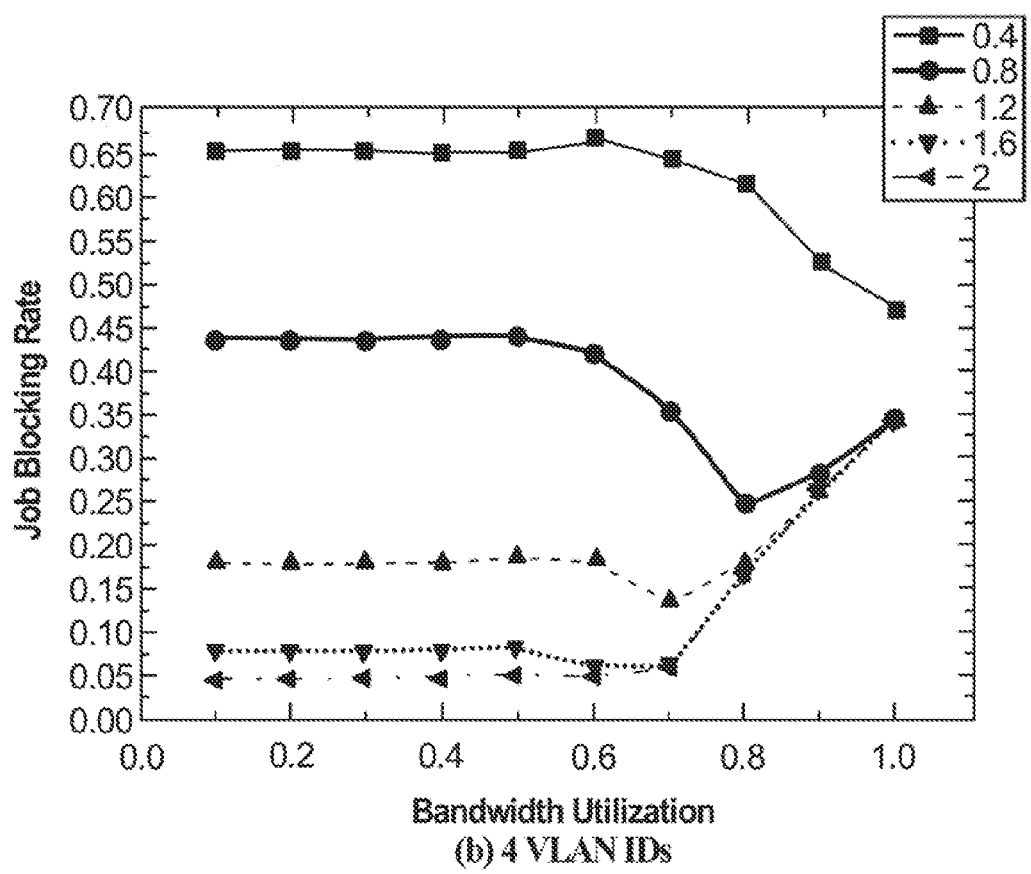
Figure 18C:
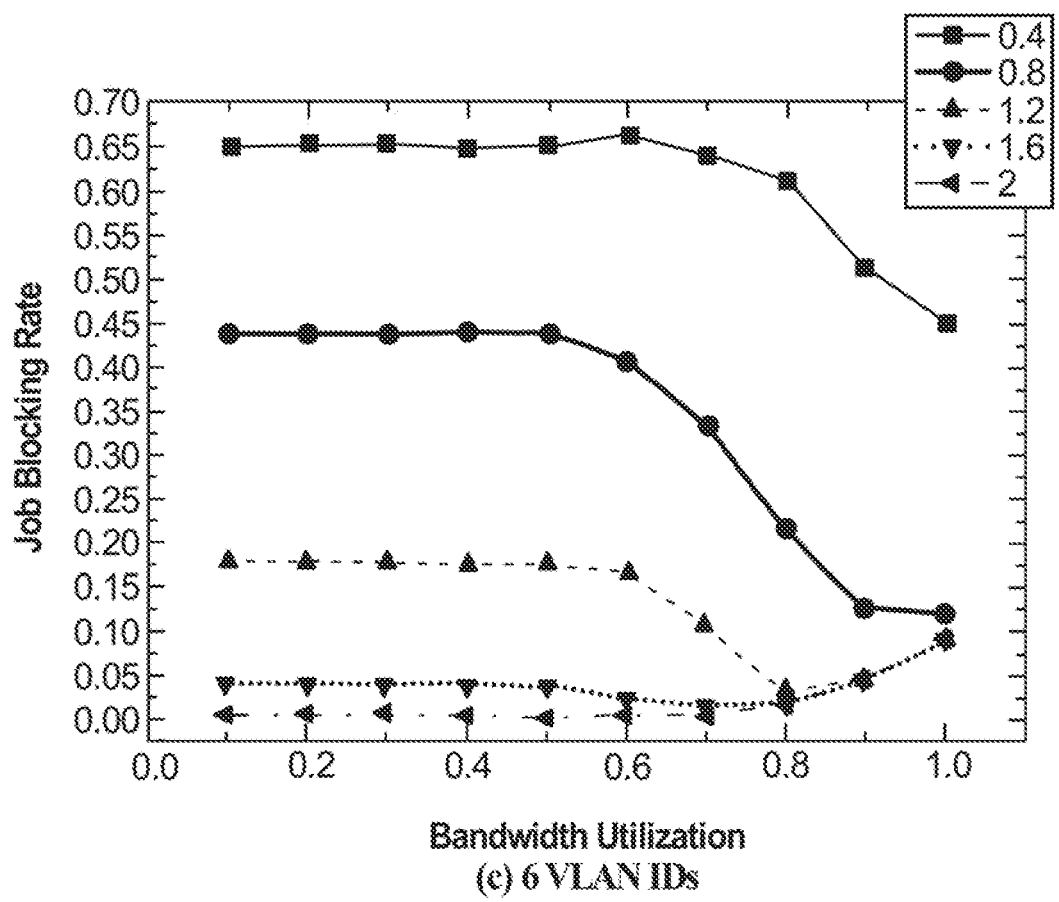
Figure 18D:
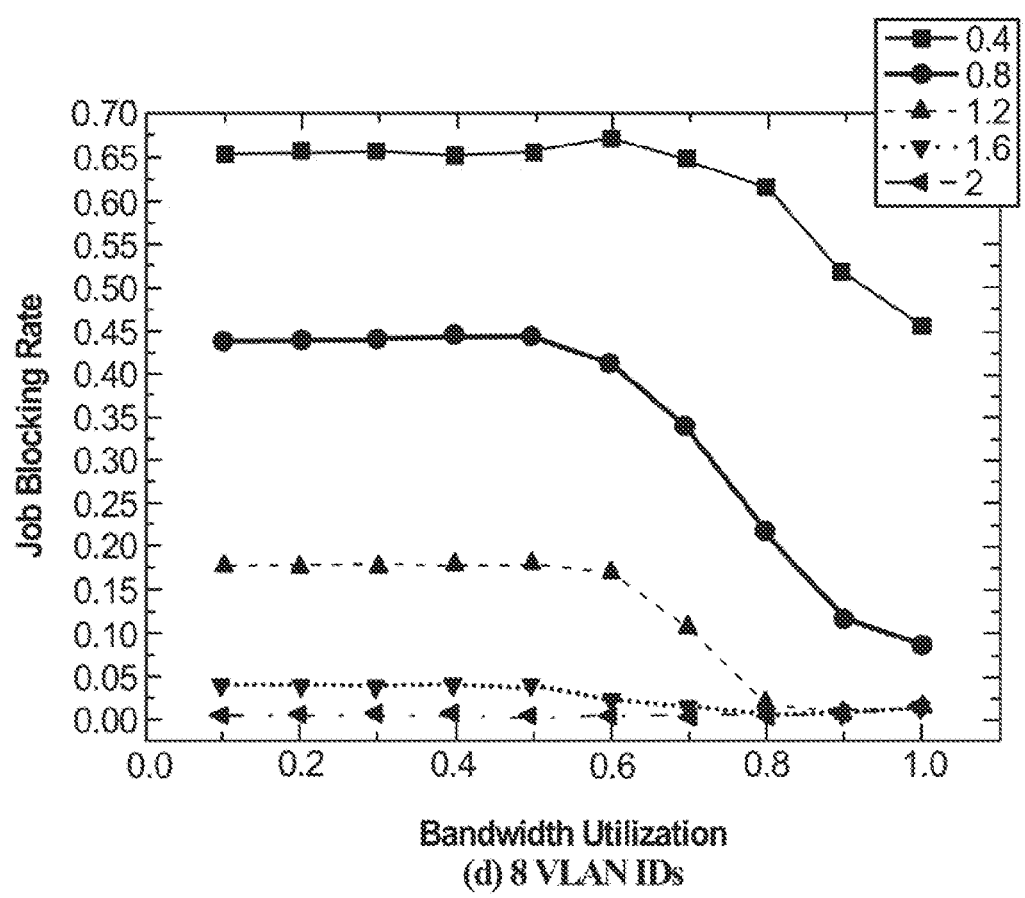

In Case 2, a sufficient capacity and varying number of available VLAN IDs is tested. FIG. 16 shows that reservation consolidation substantially reduces the job blocking rate when there is sufficient capacity (assuming $r_{cb}$=2) and a varying number of available VLAN IDs. Sufficient capacity requires that $r_{cb}$ be large enough that a job will not be blocked due to capacity constraints. Any value of $r_{cb}$ larger than two will not make a significant difference.

In Case 3 concerns a limited number of available VLAN IDs with different bandwidth requests is tested. In each of FIGS. 17*a-d*, one value of $r_{cb}$ is fixed and the job blocking performance is evaluated with varying numbers of available VLAN IDs. For example, when $r_{cb}$=1.2 and the bandwidth utilization is larger than 0.6, the blocking rate in the case of two available IDs begins to increase as in Case 1. However, there is a drop in blocking rate in other cases if there are more IDs. The uses of available IDs (by reducing circuit consolidation) can compensate for limited bandwidth. When bandwidth utilization increases further, all IDs are used and the blocking rate begins to increase again.

In Case 4, in which bandwidth requests are varied under different numbers of available VLAN IDs, the results shown in FIGS. 18*a-d* also verify the results discussed above. In FIGS. 18*a-d*, one value of available VLAN IDs is fixed and the job blocking performance is evaluated with varying $r_{cb}$. These results can be explained by an analysis similar to that discussed above concerning Case 3.

The survivability of a data transfer is crucial for data transfer applications. In TeraPaths, the survivability issue is viewed from a "do no harm" perspective. Since TeraPaths reserves an end-to-end path to optimize servicing the needs of an application, which may or may not be aware of TeraPaths technology, a primary concern is to avoid situations where an application is disrupted due to failure along an established end-to-end path. Thus, it is advantageous to focus on techniques that detect and remedy configuration failures within end-sites network devices as soon as possible and handle WAN circuit failures.

Figure 19:
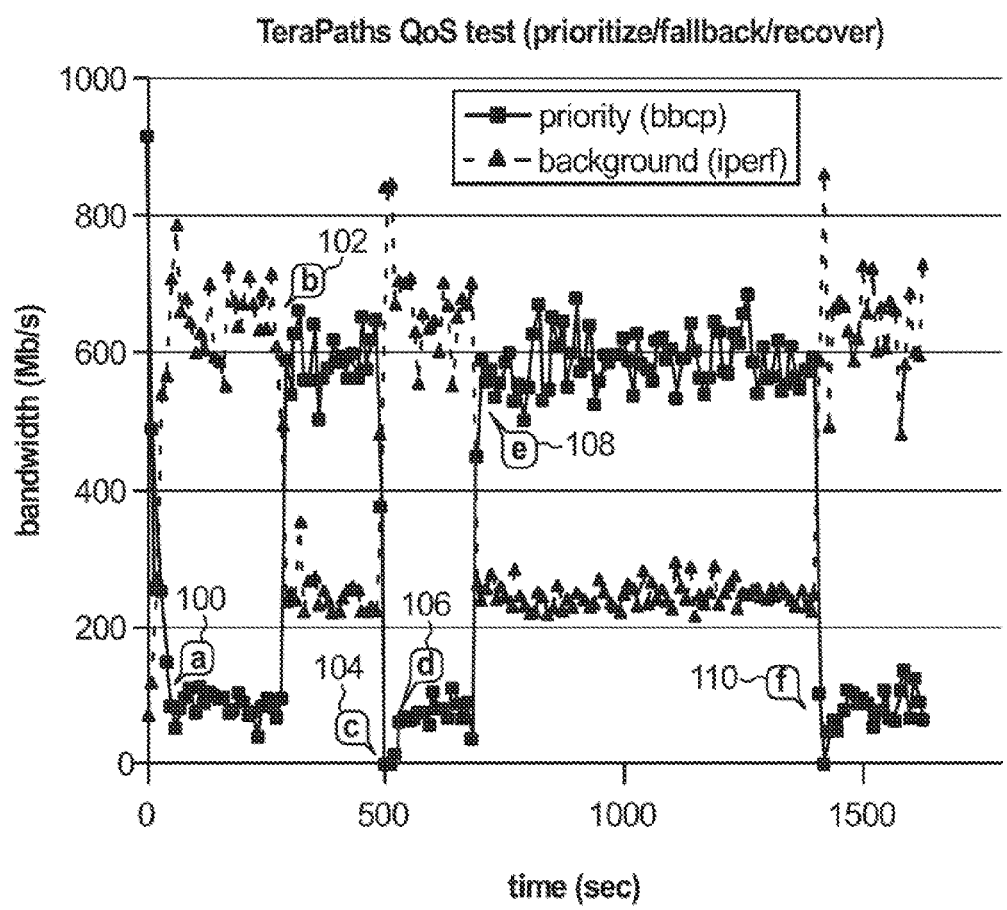
FIG. 19 shows experimental results of a TeraPaths quality of service (QoS) test example including path reservation, failure, failover, and recovery in a plot of bandwidth v. time.

In the event of a circuit failure for any reason, flows that are directed into the failed circuit will be interrupted, which causes the corresponding applications to lose their connections. To prevent such a situation, TeraPaths can optionally utilize, active circuit probing at the network device level. In this context, the end-site network devices (or border routers) that are the end points of a WAN circuit, periodically or on-demand exchange probes through that circuit for the duration of each related reservation. FIG. 19 shows the results of a QoS test of the TeraPaths recovery procedure in terms of bandwidth as a function of time. Competing traffic causes a drop in bandwidth at point a 100, and the QoS/circuit reservation is active at point b 102. The circuit fails at point c 104, and when the failure is detected, the immediate step is to stop forwarding traffic into the failed circuit and fall back to the standard IP network at point d 106. The next step is to attempt to acquire a new circuit and redirect traffic back into the new circuit at point e 108, while extending the reservations by the amount of time lost until point f 110. The latter step is subject to WAN circuits becoming available again. Thus, TeraPaths keeps trying for a pre-determined amount of time, after which the reservation will be considered failed.

With frequent periodic probes, it is possible to catch a circuit failure early and attempt to remedy the problem so that applications do not lose their connections, which is transparent to applications. However, this technique can impose significant load on the network hardware with increasing numbers of reservations. Thus, only highly critical reservations should be safeguarded with frequent periodic probing. A more scalable solution is to make applications aware of the probing and/or recovery capabilities and enable these applications to trigger probing and recovery on-demand. For example, TeraPaths exposes these capabilities through its API.

An alternative, albeit more resource-consuming, approach to recovery is to a backup circuit reserve in advance and, upon detection of a failure, switch application traffic to the backup circuit rather than failing over to the best effort network and attempting to re-acquire the failed circuit. Steering traffic from one circuit to another is essentially instantaneous once a failure is detected. Therefore, the application should not be able to notice anything more than a short-lived variation in bandwidth.

Yet another technology used in StorNet is the On-demand Secure Circuits and Advance Reservation System (OS-CARS), which is a guaranteed bandwidth provisioning system for the ESnet standard IP network and advanced Science Data Network (SDN). OSCARS meets the requirements of data-intensive scientific applications through dynamically provisioned virtual paths with a guaranteed QoS, and has demonstrated that an end-site can reserve bandwidth within ESnet to accommodate deadline-based scheduling. OSCARS initially provided guaranteed bandwidth circuits within ESnet in the form of MPLS tunnels via layer 3. Through a collaboration between ESnet and Internet2, OSCARS evolved into a more general Inter-Domain Controller (IDC) that provides not only MPLS tunnels within ESnet, but also guaranteed bandwidth layer 2 circuits within and between ESnet's Science Data Network (SDN) and Internet2's Dynamic Circuit Network (DCN).

Access to OSCARS circuit reservations is offered via a web interface. In addition, OSCARS functionality is exposed through a web services API for automatic invocation from programs. The API includes basic primitives for establishing and managing circuit reservations (create, cancel, query, list) and L2-specific primitives to signal and teardown dynamic circuits. TeraPaths utilizes a client module to automatically submit circuit reservation requests and manage these reservations on behalf of end-site users and/or applications. The selection of the actual WAN path is may be left at the discretion of OSCARS for simplicity and maximum flexibility in satisfying a request. The path provisioned by an OSCARS reservation is expected to satisfy the bandwidth requirements. However, the end-sites do not participate in routing decisions. OSCARS includes support for obtaining topology information and specifying a preferred path in reservation requests. Selecting inter-domain paths is desirable from the end-site perspective for reserving, for example, lower latency routes. However, OSCARS adds another dimension of complexity to reserving a path, since end-sites use topology information and decide which route is preferable based on certain criteria, while the chances of successfully reserving a path likely decrease as OSCARS is presented with a less flexible request.

StorNet is a versatile, end-to-end, performance-guaranteed data transfer system based on a storage resource management system (BeStMan/SRM) and a tool for providing virtual paths with bandwidth guarantees (TeraPaths). By integrating and optimizing storage and network bandwidth provisioning and storage space reservation together in an end-to-end manner, StorNet provides data transfer applications with guaranteed and predictable QoS.

At the core of StorNet is a flexible protocol that enables BeStMan SRMs to interoperate with TeraPaths instances, which interoperate with OSCARS Inter-Domain Controllers (IDCs), and negotiates reservation of virtual network paths with guaranteed QoS parameters spanning multiple network domains. Subsequently, SRMs use the established virtual paths to perform data transfers with increased reliability and predictability in terms of bandwidth utilization and transfer duration. StorNet also provides users and applications with capabilities to detect and recover from failures, not only within the network, such as those due to failed connections, but also within the storage sites, such as those due to malfunctioning hardware and/or software.

Figure 20:
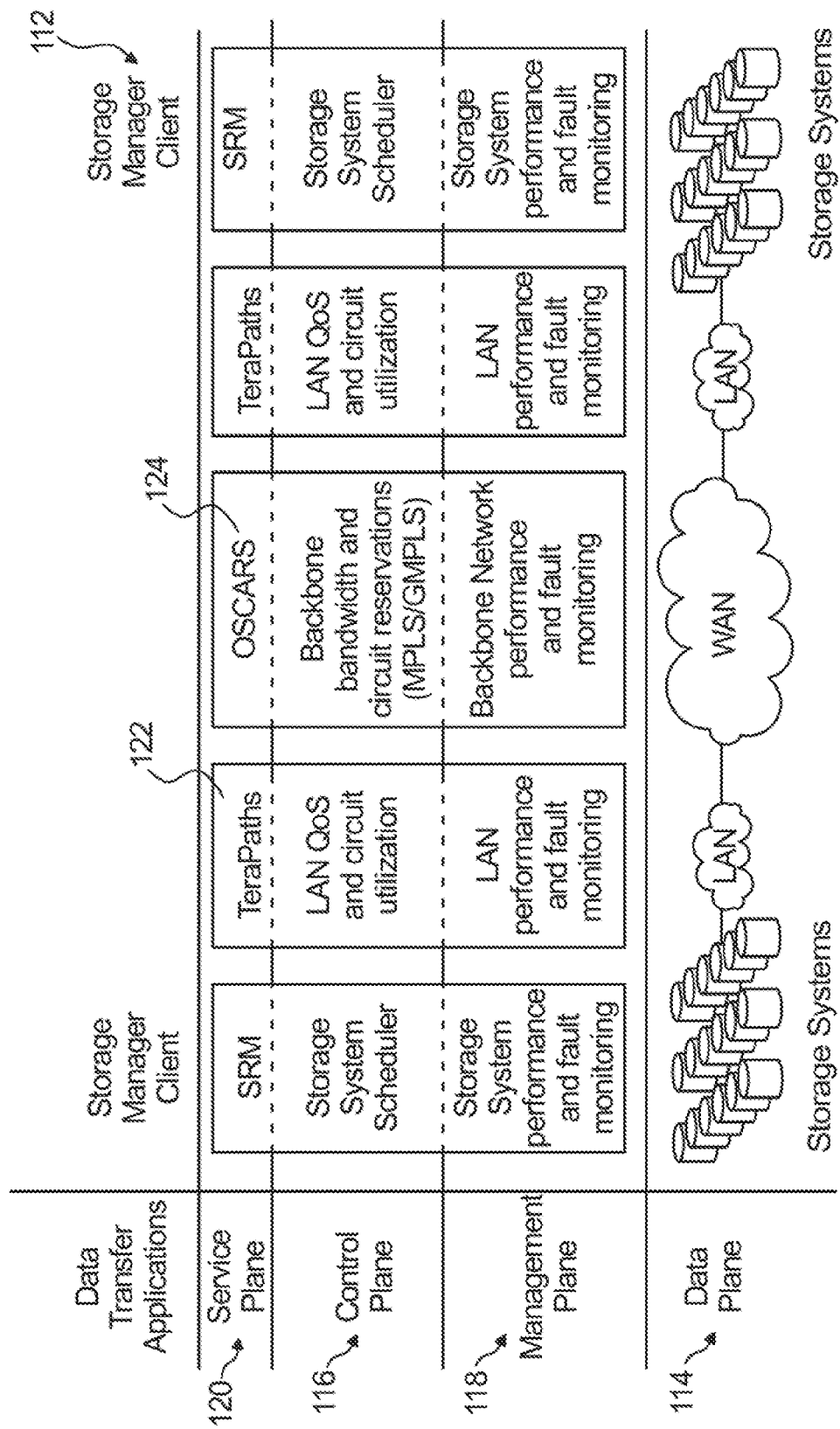
FIG. 20 shows a block diagram of a StorNet application framework.

In the StorNet framework 112, a layered approach to compose the functionality of multiple systems and achieve the overall goal of efficient, high-performance data transfers is followed as shown in FIG. 20. The framework includes four layers: 1) the data plane 114 includes network infrastructure and network devices that send and receive data, such as disk and/or tape storage systems, site LANs and a WAN backbone; 2) the control plane 116 includes network and storage resource schedulers, LAN quality of service (QoS) provisioning and circuit utilization systems, and WAN backbone bandwidth and circuit provisioning systems based on MPLS/GMPLS traffic engineering; 3) the management plane 118 includes network resource performance and fault monitors that monitor network resource functionality and performance, diagnose faults, coordinate fault recovery attempts, and provide management plane feedback; and 4) the service plane 120 reserves resources and exposes the functionality of individual systems, while also providing authentication and authorization. The service plane interacts with the control plane to dedicate data plane resources to meet data transfer and storage requirements based on application requests.

In FIG. 20, the horizontal direction represents end-to-end functionality. The components in the planes serve an end-to-end goal. The data plane 114 is the vehicle of a data transfer between end-site storage systems via the interconnecting network. The management plane 118 provides an enterprise view of performance metrics that can be used for diagnosing problems. The control plane 116 enacts directions from the service plane into system configurations that physically provision the required resources. The service plane 120 negotiates the reservation of resources across domains so that an application request can be accommodated. The vertical direction represents system integration. BeStMan/SRM schedules and coordinates access to storage systems and data transfers in response to an application request. TeraPaths 122 schedules end-site LAN bandwidth and configures LAN devices to dedicate this bandwidth to specific network traffic. OSCARS 124 schedules and provisions bandwidth in the WAN domains that interconnect the end-sites.

Figure 21:
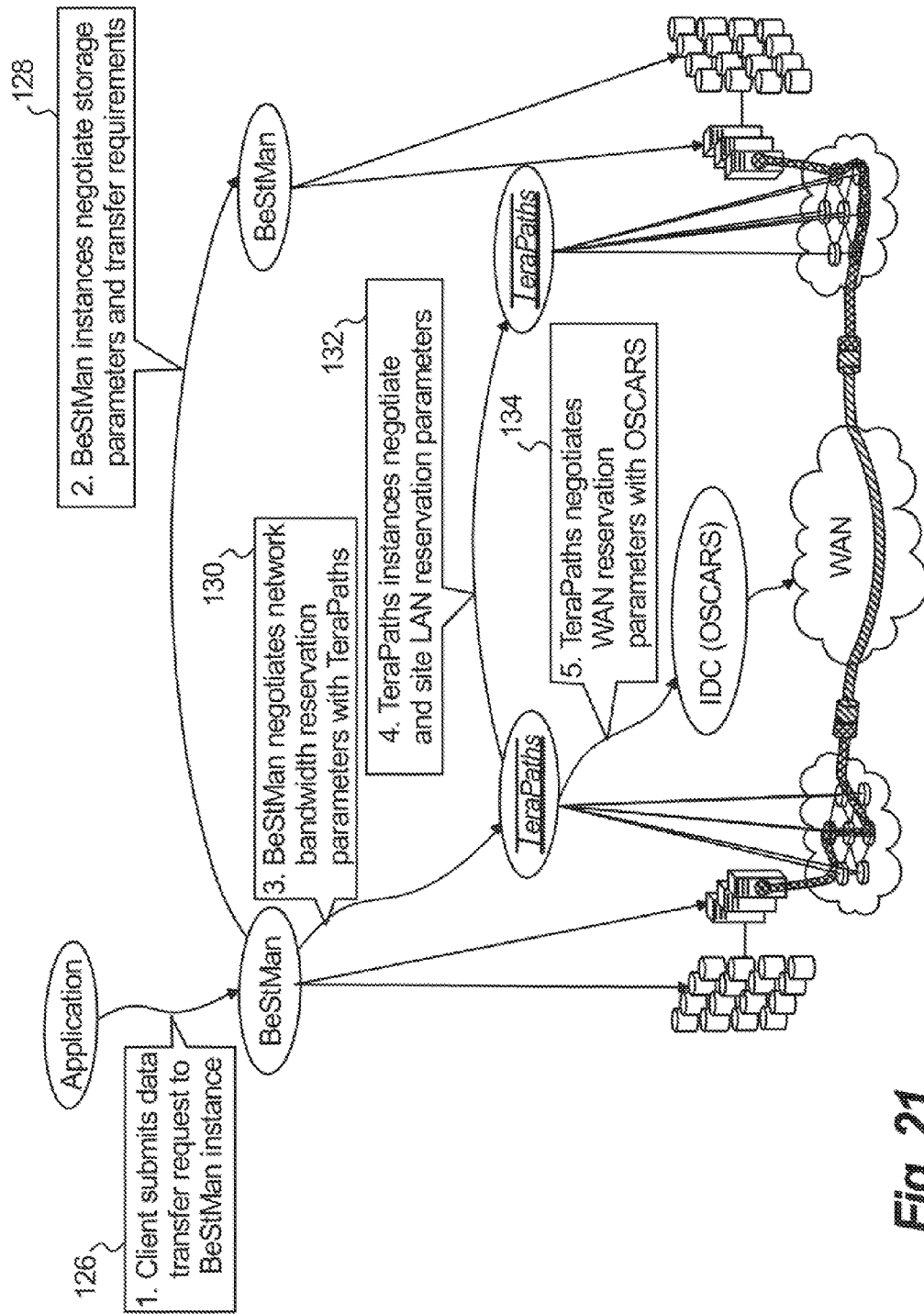
FIG. 21 shows a block diagram of the StorNet workflow.

System interactions take place at the service plane 120 layer. As shown in FIG. 21 triggered by a client's request 126, end-site SRMs first coordinate between themselves to reserve storage space, and determine the parameter space that satisfies the request in terms of maximum bandwidth and maximum time to completion 128. This parameter space is then passed to TeraPaths 122 as a request for network bandwidth reservation 130. TeraPaths 122 instances coordinate between themselves to match the SRM request to LAN resource availability 132. Subsequently, TeraPaths 122 generates corresponding requests for WAN bandwidth reservations and submits these requests to OSCARS 134. When multiple WAN domains are involved, OSCARS 124 inter-domain controllers (IDCs) coordinate in a daisy-chain manner to establish the path interconnecting the end-sites. However, this coordination is done transparently, that is, TeraPaths 120 typically interacts with one IDC as is also shown in FIG. 21.

The design and enhancements of the components in the service plane, in particular the communication and coordination of bandwidth between BeStMan, TeraPaths, and OSCARS, will now be discussed.

In extreme scale science environments, the resources located at different sites, such as computing power and storage space, are allocated jointly with network resources to achieve a cost-effective and reliable data transfer and sustain the desired overall performance of distributed tasks. For example, a site with rich storage resources may not be a good candidate for data backup if its network connectivity with other sites is poor. In such an environment in which users share and compete for resources, it is critical to achieve efficient resource utilization with suitable co-scheduling schemes. StorNet addresses a general resource co-scheduling (RCS) problem, which is, given a set of limited resources of different types and a variety of requests from data-intensive applications, determine how to optimally allocate and schedule the resources required by each application. For example, an application performing a time-constrained end-to-end data transfer may simultaneously require a bandwidth-guaranteed network circuit and a number of dedicated CPUs and hard disks to reliably transfer data from source disks to destination disks over the network at known rates and meet its deadline. Thus, the types of resources required are jointly allocated and co-scheduled.

A reservation negotiation algorithm is as follows: obtain individual BAGs in linear time; input reservations [earliest start time, deadline]; generate bandwidth usage graph (BUG) as a step function; subtract BUG from maximum path capacity to obtain BAG; allocate reservations for intersecting BAGs in linear time; merge time steps; and select the minimum bandwidth value for each step.

Figure 22A:
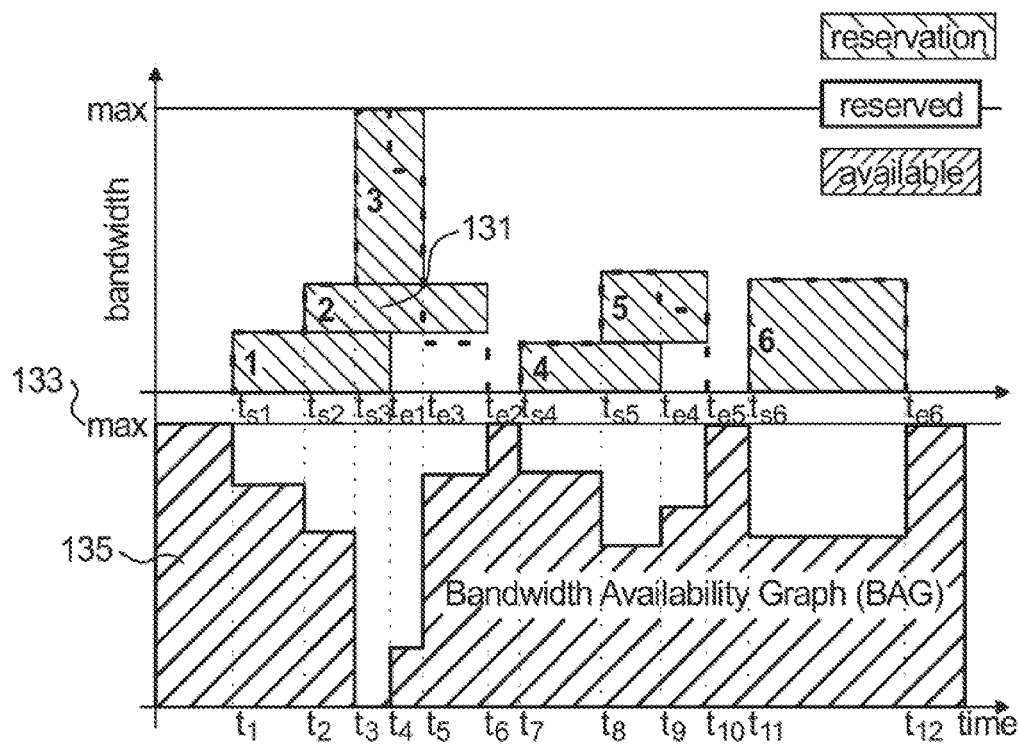
FIGS. 22A-D shows bandwidth availability graphs for various examples of resource co-scheduling in plots of bandwidth v. time.
Figure 22B:
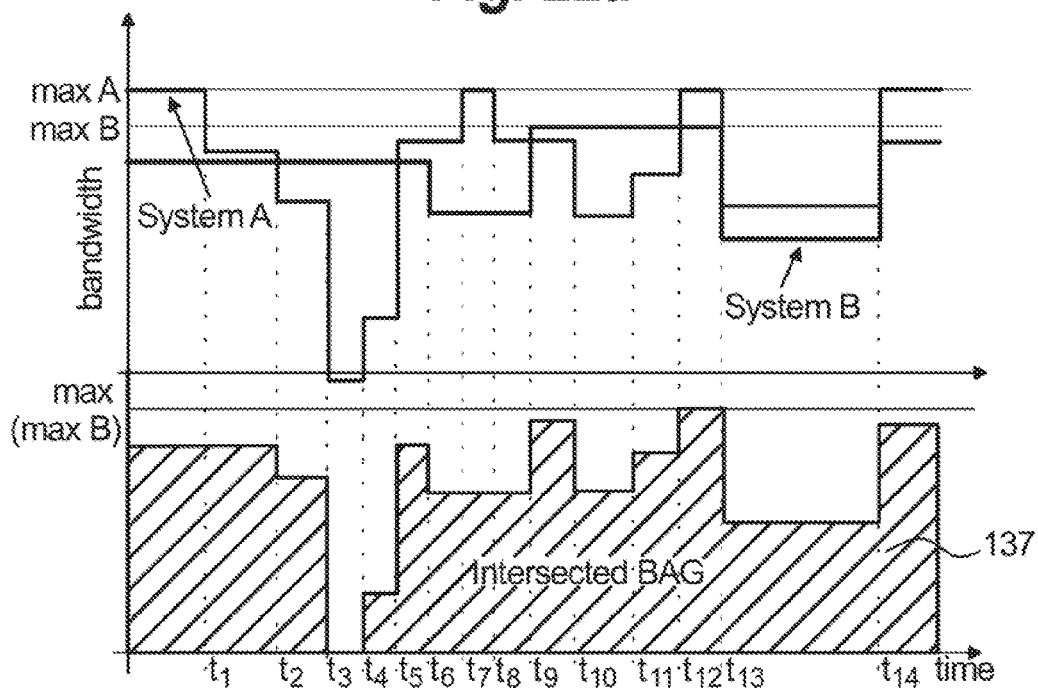

In StorNet, an analytical model of resource co-scheduling based on an end-to-end bandwidth availability graph (BAG) is used. The utilization of each resource type is scheduled by advance reservations with specific start and end times and constant bandwidth allocation for their duration. The bandwidth allocation of such a set of reservations can be aggregated, represented by a bandwidth usage graph (BUG) 131, and subsequently subtracted from the maximum bandwidth availability 133 for the overall time period to yield the BAG 135 for the resource of interest as shown in FIG. 22a. Maximum availability can vary with time, but can typically be considered constant, at least within known time intervals. Thus, the BAG 135 is a step function. In a storage system, for example, the maximum availability 133 could be the total achievable transfer rate, and in a network domain, the maximum achievable bandwidth. Individual BAGs 135 can be intersected to express the minimum availability of the initial BAGs at any given time, which provides the overall availability of resources across any number of systems as shown in FIG. 22b. The intersection of all BAGs for the source and destination storage systems and interconnecting network domains yields the end-to-end BAG 137.

Figure 22C:
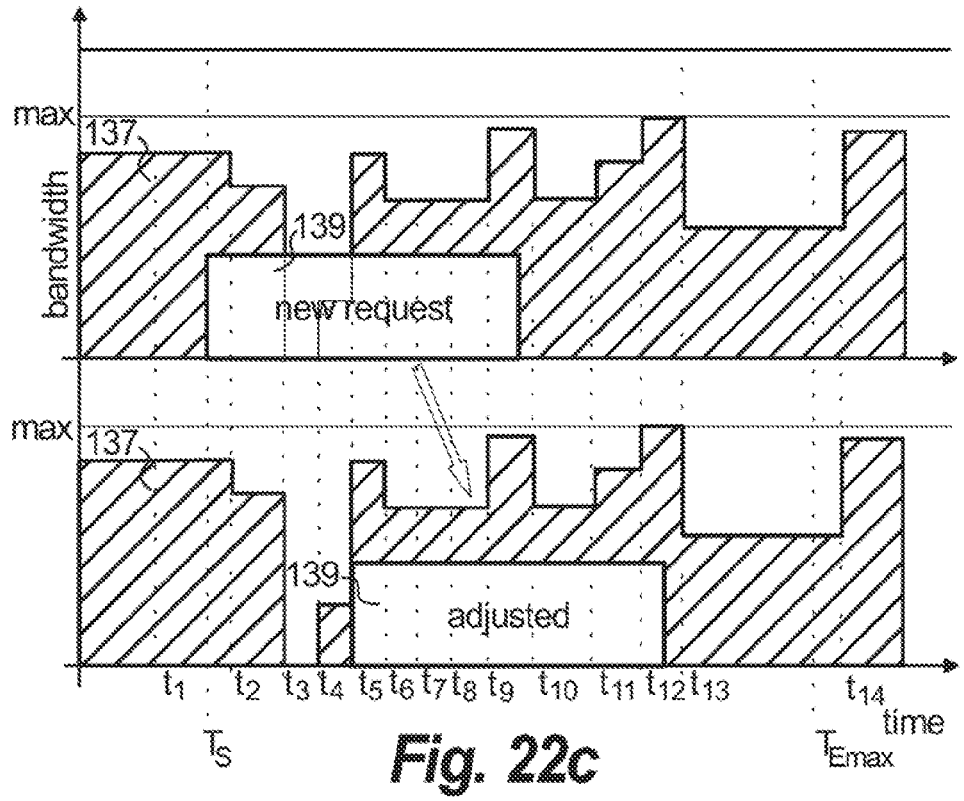
Figure 22D:
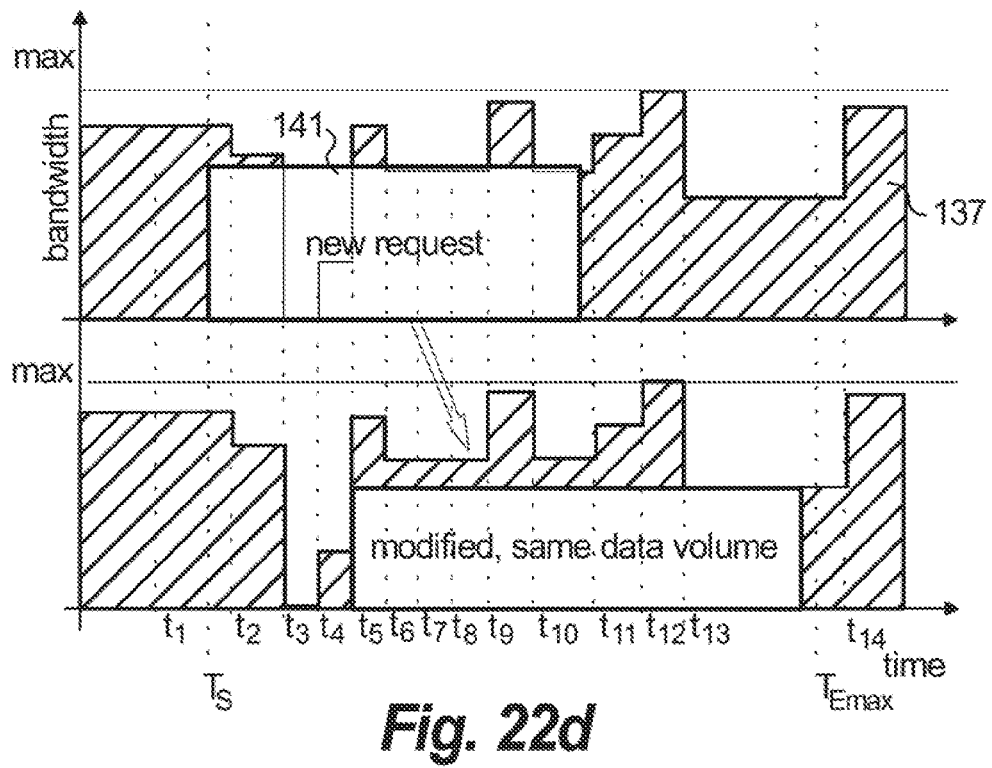

Subsequently, a new request for reserving a resource can be represented by a rectangle 139 as shown in FIG. 22c. If the rectangle 139 fits into the overall or end-to-end BAG 137, then the request can be satisfied. A request may be flexible in terms of start time, duration, and/or bandwidth so that the rectangle 139, 141 can be modified to fit into the BAG 137 as shown in FIG. 22c-d. In the latter case, the area of the rectangle 139, 141 represents the total volume of data to be transferred, and any modification to the start time, duration, and/or bandwidth results in a rectangle 139, 141 with the same area as the initial one. The objective of fitting the request rectangle is to obtain a solution, that is, a set of reservation parameters acceptable across all systems in the end-to-end desired path, which optimally satisfies the request. The optimal solution satisfies the request according to the requestor's preferences. Primary consideration has been given to the cases of shortest transfer duration and earliest finish time.

Figure 23A:
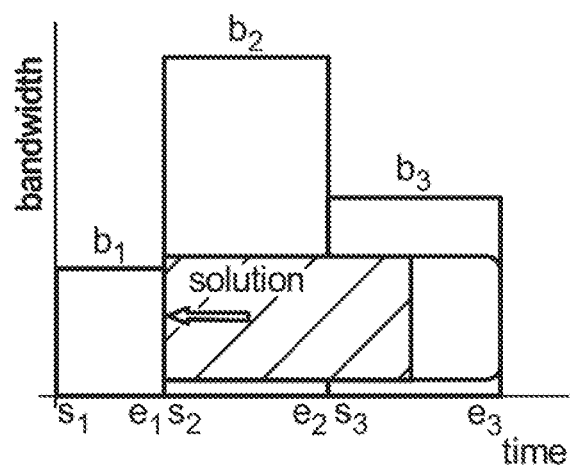
FIGS. 23a-b shows a bandwidth allocation graph (BAG) fitting problem in plots of bandwidth v. time.
Figure 23B:
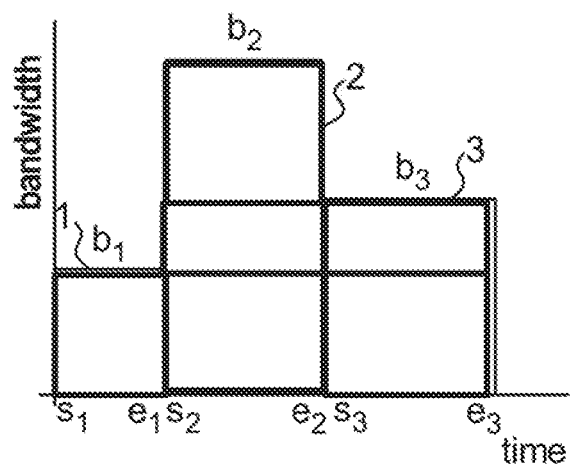

Fitting the request rectangle can be approached as a variation of the problem of finding the largest rectangle under a histogram with n adjacent rectangles, which can be solved in O(n) (linear) time. More specifically, a BAG is represented by a sequence of n windows $[s_i, e_i]$, where s is the start time, e is the end time, and each of s and e have a constant bandwidth $b_i$ (the histogram). First, an optimal solution can start from some si. If an optimal solution starts elsewhere within a window, the whole solution (or rectangle) can be moved to the left until it starts from the $s_i$ point. The solution will have an identical duration but an earlier finish time as shown in FIG. 23a. Second, n rectangles {start[i],end[i]} with bandwidth bi can be obtained, wherein start and end denote the start and end time of the largest rectangle containing window i as shown in FIG. 23b. A request with a given data volume can then be fitted in these n largest rectangles and the rectangle with the shortest duration or the earliest finish time can be selected depending on preferences associated with the requests.

Based on the observations discussed above, the optimal solution can be obtained in O(n) linear time using an algorithm for the problem of finding the largest rectangle under a histogram. In other words, given a BAG, it will take O(n) time, i.e., time proportional to the number of BAG windows, to obtain start[i] and end[i] of the largest rectangle corresponding to every window in the BAG. Pseudocode for an example of such an algorithm that uses a stack is shown in FIG. 24. The stack holds a series of windows that have increasing heights. The windows are enumerated from left to right.

StorNet approaches schedule negotiation in a top-down direction across systems. Narrowing down the solution space is first performed at the SRM level, then at the TeraPaths level, and finally at the OSCARS level. This is done for two major reasons. First, the availability of resources within each system must take into account the aspects of system-wide policies and user privileges. Second, the amount of effort to determine a solution is reduced. Although BAG intersection is commutative, using a separate scheduling component is not feasible since it would require systems belonging to different administrative domains to reveal non-public information in a bottom-up manner. For example, OSCARS cannot be expected to reveal all schedule information pertaining to a network path of interest to TeraPaths. In contrast, in the top-down direction, only non-sensitive information satisfying the original request is passed from one system to another to obtain solutions. An additional incentive for minimizing the candidate solution set is that OSCARS may not support negotiation with BAGs and candidate solutions may be tried one-by-one in a costly trial-and-error manner. Reducing the number of options based on previous constraints reduces the search space, and thus interaction with OSCARS.

BeStMan Functionality Enhancements will now be discussed. The data transfer protocols used by BeStMan, such as GridFTP, assume best-effort IP networks, and improve performance with a large number of transfer control protocol TCP streams for long, round-trip connections. However, fairness and efficiency are adversely affected by such a data transfer technique. A goal of StorNet is to provide data transfers with QoS guarantees and to move away from the best-effort data transfer paradigm that does not provide delivery time assurance. To support network and storage co-scheduling, the existing data transfer module in BeStMan is extended to reserve end-to-end network bandwidth and intelligently optimize storage space and network bandwidth allocation, thus increasing transfer reliability. This extension will reduce the mismatch between end user data transfer applications, storage, and the network. In order to keep track of bandwidth reservations and commitments, BeStMan is also enhanced with a backend database service. This provides persistent storage for tracking user requests, storage space allocations, and bandwidth allocations.

The enhanced BeStMan is designed to achieve the best solution for user requests. Users can specify whether they prefer earlier time solutions or shortest transfers, and users provide BeStMan with a desired time of completion. The BeStMan at the target site (pulling the data) also has the logic to communicate with the source BeStMan to determine its bandwidth availability. The source BeStMan returns availability for the requested period of interest (until maximum time) in the form of a sequence of windows. The target BeStMan then finds a common schedule, and provides that schedule to TeraPaths. The API for BeStMan-TeraPaths interaction is discussed below.

To accommodate the functionality required for StorNet, TeraPaths is enhanced in two main directions: interaction with BeStMan and core extensions to support negotiation between end-sites and with OSCARS. Communication and coordination with BeStMan is supported by a BeStMan-to-TeraPaths (StorNet) API module that interprets and validates BeStMan requests and passes them to the main system through the TeraPaths API. The former API is essentially a wrapper of the latter. The choice of using an API wrapper allows standardization of the interaction between BeStMan and TeraPaths so that future revision of one API will not necessarily affect the other API or BeStMan's client. Core extensions to TeraPaths support negotiation between end-site instances through BAGs, calculation of solution spaces by fitting requests into intersected BAGs, and negotiation with OSCARS by applying a trial-and-error approach on the set of candidate solutions obtained from the fitting process.

A BeStMan-TeraPaths web-service interface describes functions of the BeStMan server that request network bandwidth from TeraPaths. The goal of this API is to enable BeStMan to negotiate bandwidth with TeraPaths. The important functionalities reflected in the interface are bandwidth reservation, commitment, modification, and cancellation. The interface also includes status check and time-out extension. Information, such as data volume, source and target resource availability, resource time frames, and other attributes, is provided to TeraPaths when requesting network bandwidth. FIG. 21 shows the sequence of communications between components. In step (1) 126, which involves getting the request from the application, a list of files or a directory are provided as well as the source and destination. In addition, a window with a desired start time and maximum completion time is provided. In step (2) 128, the source and target BeStMan servers communicate with each other to reserve storage space and to determine the maximum bandwidth they can both use during the requested window. Once this is determined, BeStMan communicates with TeraPaths in step (3) 130 and provides a sequence (start time and end time) of non-overlapping windows, as well as the maximum bandwidth for these windows. Based on this information, TeraPaths schedules its local area resources and negotiates with OSCARS for wide area resources. The communications in steps (4) 132 and (5) 134 are internal to TeraPaths, and the resulting reserved window is communicated to BeStMan. A typical scenario is that BeStMan first tries to make a temporary network bandwidth reservation. If such a reservation is possible, TeraPaths returns a request token, along with an expiration time and available windows for the available resources. Once BeStMan determines that it can work with the result from TeraPaths, it commits the reservation to lock in the network resources. Otherwise, BeStMan modifies its input and submits a new request.

Primary functions of the BeStMan-TeraPaths API include the following: ReserveRequest( ) which inputs flow specs (source/destination IPs and ports), bandwidth, start time, end time, and transfer volume, and outputs request token and reservation ids; CommitRequest( ), which commits the network reservation; and CancelRequest( ) which cancels the network reservation. Auxiliary functions of the BeStMan-TeraPaths API include the following: StatusRequest( ), which requests status of the network reservation; ExtendTimeoutRequest( ) which extends the timeout period associated with the network reservation; and ModifyRequest( ) which modifies request parameters-primarily needed when flow specs are not known at the time of the network reservation request.

BeStMan services in StorNet include SRM storage services (processing storage service requests and subsequent coordination of the network plane), network reservation services (reservation of end-to-end circuits connecting two storage places through TeraPaths), and status requests (monitor SRM data transfer progress and performance, and monitor end-to-end circuit state and performance).

A summary of the reservation negotiation process is as follows: BeStMan sends a (storage) Bandwidth Availability Graph (BAG) to TeraPaths along with a flexible request (earliest state time, deadline, data volume); master TeraPaths resource manager gathers BAGs from LANs at local and remote end-sites and intersects all BAGs (BeStMan and end-site LANs) to form a BAG reflecting overall availability at end-sites; and TeraPaths obtains an ordered list of best reservations from end-site BAG and submits them to OSCARS individually until one succeeds, or TeraPaths requests the WAN path BAG, intersects this with the end-site BAG to get an end-to-end BAG, and then fits the reservation request to the end-to-end BAG.

Figure 25:
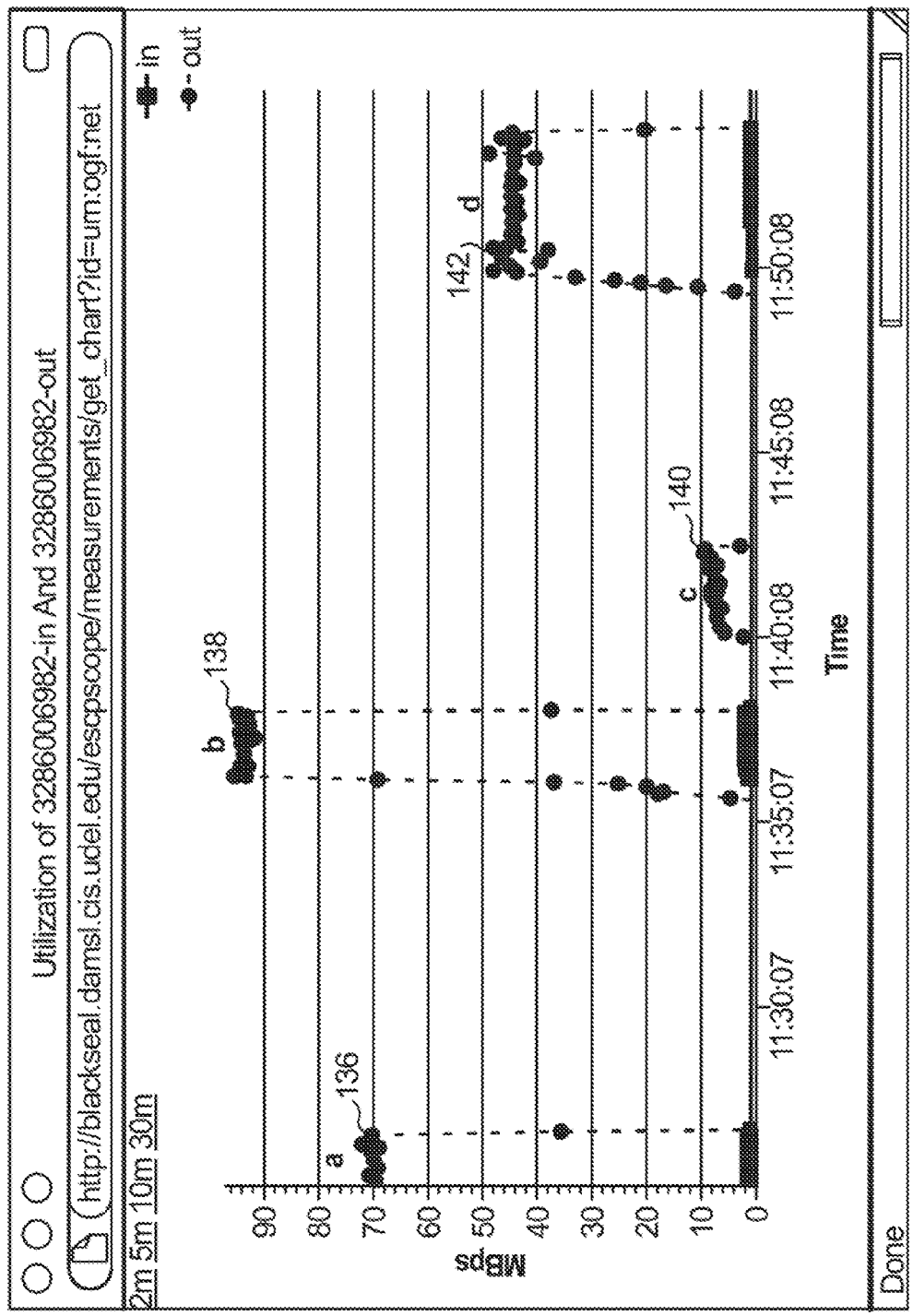
FIG. 25 shows utilization results of a StorNet functionality demonstration in terms of MB/s as a function of time.

StorNet functionality was demonstrated using 10 GB file transfers, the results of which are shown in FIG. 25. Areas (a) 136, (b) 138, and (d) 142 represent transfer of a 10 GB file with 70 MB/s, 95 MB/s, and 45 MB/s reservations, respectively. Area (c) 140 represents a transfer of a 1 GB file without reservation. Heavy interference traffic allowed best effort transfers to reach only about 8 MB/s, as shown by area (c) 140, while transfers with StorNet could be tuned to desired levels of bandwidth as shown by areas (a) 136, (b) 138, and (d) 142, which were unaffected by network congestion. Due to the low performance of best effort transfers, a smaller file of 1 GB size was used to save demonstration time.

Effective and robust data transfer is essential to current scientific applications, and is a major concern for future scientific work as the volume of data collected and shared grow exponentially. In order to address this problem, two aspects are supported: 1) a method of reserving and guaranteeing bandwidth in network and storage, and 2) a method of coordinating and synchronizing bandwidth reservations in components from the source to the destination. Storage systems should be used to support such bandwidth reservations and coordinate with local area and wide area network bandwidth provisioning. For this purpose, components that can control the bandwidth reservations, provision the bandwidth, and ensure that the allocated bandwidth is used effectively are used. StorNet uses storage and local network middleware technologies (BeStMan and TeraPaths) for this purpose. Bandwidth provisioning in the WAN is realized by having TeraPaths negotiate with the OSCARS provisioning system. This coordinated approach is achieved by enhancing the existing middleware systems with APIs for negotiating end-to-end bandwidth reservations and obtaining monitoring information.

StorNet targets the reservation of a single transfer window per request, that is, of a window with constant bandwidth (height) and specific time duration (width). Given a busy network, there is a possible solution if such a window is scheduled into the future beyond current commitments. A more attractive solution is to allow for multiple windows per request by filling available reservation gaps. Such a solution is enabled by having multiple windows per request in the APIs, and addressing this possibility in the future after the single window strategy is fully implemented.

The design parameters and goals of TeraPaths include provisioning true end-to-end (host-to-host) virtual paths through direct configuration of end-site network devices and indirect configuration of WAN domains through tight interoperation with OSCARS. One of TeraPaths' functions is to create network virtualization. Virtualization is used to provide a level of abstraction between applications and shared infrastructure so that the shared infrastructure is presented to the application as if it were a dedicated resource, and the application can use its familiar methods to access the shared infrastructure.

Figure 26:
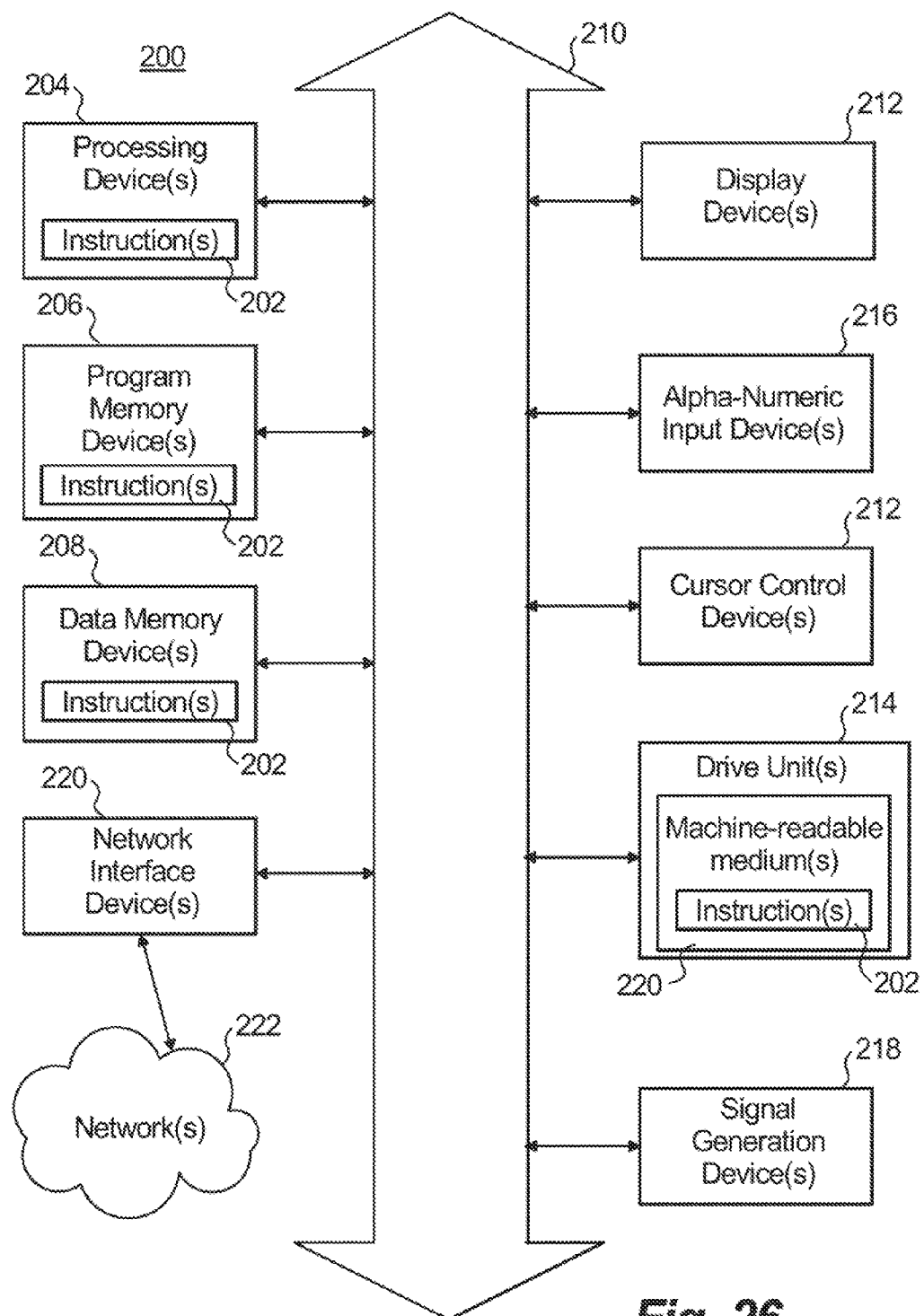
FIG. 26 is a block diagram of an embodiment of a computing device or machine in the form of a computing system, within which is a set of instructions, that when executed, cause the machine to perform any one or more of the methodologies disclosed herein.

FIG. 26 is a block diagram of an embodiment of a machine or device in the form of a computing system 200, within which is a set of instructions 202, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a PDA (personal digital assistant), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 200 may include a processing device(s) 204 (e.g., a CPU (central processing unit), a GPU (graphics processing unit), or both), program memory device(s) 706, and data memory device(s) 208, which communicate with each other via a bus 710. The computing system 200 may further include display device(s) 212 (e.g., liquid crystals display (LCD), a flat panel, a solid state display, or a cathode ray tube (CRT)). The computing system 200 may include input device(s) 216 (e.g., a keyboard), cursor control device(s) 212 (e.g., a mouse), disk drive unit(s) 214, signal generation device(s) 218 (e.g., a speaker or remote control), and network interface device(s) 220.

The disk drive unit(s) 214 may include machine-readable medium(s) 220, on which is stored one or more sets of instructions 202 (e.g., software) embodying any one or more of the methodologies or functions disclosed herein, including those methods illustrated herein. The instructions 202 may also reside, completely or at least partially, within the program memory device(s) 706, the data memory device(s) 208, and/or within the processing device(s) 204 during execution thereof by the computing system 200. The program memory device(s) 206 and the processing device(s) 204 may also constitute machine-readable media. Dedicated hardware implementations 204, but not limited to, application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing that can also be constructed to implement the methods described herein.

The disclosed embodiments contemplate a machine-readable medium containing instructions 202, or that receives and executes instructions 202 from a propagated signal so that a device connected to a network environment 222 can send or receive voice, video, or data, and to communicate over the network 222 using the instructions 202. The instructions 202 may further be transmitted or received over a network 222 via the network interface device(s) 220. The machine-readable medium may also contain a data structure for storing data useful in providing a functional relationship between the data and a machine or computer in an illustrative embodiment of the disclosed systems and methods.

While the machine-readable medium is shown in an example embodiment to be a single medium, the term "machine-readable medium" should be taken to include a single medium or multiple media (e.g., a centralized or distributed database, and/or associated caches and servers) that store one or more sets of instructions. The term "machine-readable medium" shall also be taken to include any medium that is capable of storing, encoding, or carrying a set of instructions for execution by the machine and that cause the machine to perform anyone or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium, such as a disk or tape; and/or a digital file attachment to e-mail or other self-contained information archive or set of archives that is considered a distribution medium equivalent to a tangible storage medium. Accordingly, the disclosed embodiments are considered to include any one or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiments are not limited to such standards and protocols.

The illustrations of embodiments described herein are intended to provide a general understanding of the structure of various embodiments, and they are not intended to serve as a complete description of all elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored. Although specific example embodiments have been described, it will be evident that various modifications and changes may be made to these embodiments without departing from the broader scope of the inventive subject matter described (invention) herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

While exemplary embodiments have been described herein, it is expressly noted that the scope of these embodiments is not limited to these embodiments, but rather the intention is that additions and modifications to what is expressly described herein are also included within that scope. Moreover, it is to be understood that the features of the various embodiments described herein are not mutually exclusive and can exist in various combinations and permutations, even if such combinations or permutations are not made express herein, without departing from the spirit and scope of the embodiments.

The invention claimed is:

1. A cross-domain network resource reservation scheduler configured to schedule at least one path from at least one end-site, the cross-domain network resource reservation scheduler being associated with the at least one end-site, the cross-domain network resource reservation scheduler comprising:
   a management plane device configured to monitor and provide information representing at least one of functionality, performance, faults, and fault recovery associated with a network resource;
   a control plane device configured to schedule the network resource by at least one provision local area network quality of service, provision local area network bandwidth, and provision wide area network bandwidth; and
   a service plane device configured to interface with the control plane device to reserve the network resource based on a reservation request and the information from the management plane device, the management plane device, control plane device, and service plane device being associated with the at least one end-site;
   wherein the service plane device comprises: at least one network device controller (NDC) configured to control configuration of network devices associated with a local area network, the local area network being associated with the at least one end-site;
   an end-site domain controller (ESDC) configured to control a resource associated with the local area network using the at least one NDC; and
   a distributed services module (DSM) configured to interface with the at least one ESDC to configure path segments associated with the local area network, the DSM being configured to interface with an inter-domain controller (IDC) to provide the path from the at least one end-site.

2. The cross-domain network resource reservation scheduler defined by claim 1, wherein the cross-domain network resource reservation scheduler is configured to schedule at least one end-to-end path interconnecting at least two different end-sites, the cross-domain network resource reservation scheduler being associated with at least one of the at least two different end-sites.

3. The cross-domain network resource reservation scheduler defined by claim 1, wherein the network resource comprises at least one local area network operatively coupled to at least one wide area network, the at least one local area network and the at least one wide area network being interconnected by communication links.

4. The cross-domain network resource reservation scheduler defined by claim 1, further comprising a hybrid star/daisy-chain configuration scheme in which the DSM is configured to negotiate end-site LAN reservation parameters and to subsequently negotiate WAN reservation parameters using the IDC.

5. The cross-domain network resource reservation scheduler defined by claim 1, wherein the NDC includes functionality of the network resource, thereby hiding configuration information from the control plane device and management plane device.

6. The cross-domain network resource reservation scheduler defined by claim 1, wherein dynamic service level agreements (SLAs) are established between network domains along the path from the at least one end-site.

7. The cross-domain network resource reservation scheduler defined by claim 1, wherein the service plane device is configured to consolidate overlapping reservation requests using user-defined virtual local area network identification (VLAN ID), bandwidth utilization levels, and total capacity constraints, the service plane device being configured to assign consolidated reservation requests to a circuit based on duration and capacity associated with the circuit.

8. The cross-domain network resource reservation scheduler defined by claim 1, wherein the service plane device is configured to generate a bandwidth usage graph (BUG) associated with at least one prior reservation request as a step function, the service plane device being configured to subtract the BUG from a maximum bandwidth availability associated with the network resource to obtain a bandwidth availability graph (BAG) associated with the network resource.

9. The cross-domain network resource reservation scheduler defined by claim 8, wherein the service plane device is configured to intersect a plurality of BAGs to obtain an end-to-end BAG, each of the plurality of BAGs being associated with at least one of a plurality of network resources associated with the path from the at least one end-site, the service plane device being configured to allocate a new reservation request based on the end-to-end BAG.

10. The cross-domain network resource reservation scheduler defined by claim 9, wherein the service plane device is configured to allocate the new reservation request based on the end-to-end BAG using an algorithm to determine largest rectangles under a histogram, the service plane device being configured to modify bandwidth and duration associated with the new reservation request while maintaining data volume associated with the new reservation request constant, thereby fitting the new reservation request within the largest rectangles associated with the end-to-end BAG and satisfying at least one of earliest start time constraint and latest end time constraint associated with the new reservation request.

11. The cross-domain network resource reservation scheduler defined by claim 1, wherein the DSM is configured to establish reservation parameters associated with the wide area network using a trial-and-error method with predetermined solutions.

12. The cross-domain network resource reservation scheduler defined by claim 1, wherein the network resource is configured to at least one of send data and receive data.

13. The cross-domain network resource reservation scheduler defined by claim 1, further comprising a storage resource manager (SRM) associated with a storage resource, the SRM being configured to negotiate storage and transfer parameters, the SRM being configured to negotiate network bandwidth reservation parameters with the DSM.

14. The cross-domain network resource reservation scheduler defined by claim 13 wherein the SRM represents storage system bandwidth availability as a bandwidth availability graph (BAG), the DSM determining network bandwidth reservation parameters using the BAG and reservation request parameters, the DSM being configured to intersect a plurality of BAGs along the path from the at least one end-site to obtain an end-to-end BAG, each of the plurality of BAGs being associated with at least one of a plurality of network resources along the path from the at least one end-site, the DSM being configured to allocate a new reservation request based on the end-to-end BAG.

15. The cross-domain network resource reservation scheduler defined by claim 13, wherein the storage resource is configured to at least one of send, receive, and store data.

16. The cross-domain network resource reservation scheduler defined by claim 1, wherein the scheduler is configured to schedule the at least one end-to-end path from the at least one end-site and provide network quality of service guarantees across multiple autonomous domains having different levels of hertogeneity in at least one of administrative policy, control plane technology, and data plane technology without at least one of prior inter-domain Service Level Agreements and pre-determined configuration of network devices associated with the domains.

17. A method of scheduling reservations on a path from at least one end-site, the method comprising:
monitoring, by a management plane device, and providing information representing at least one of functionality, performance, faults, and fault recovery associated with a network resource;
scheduling, by a control plane device, the network resource by at least one of provisioning local area network quality of service, provisioning local area network bandwidth, and provisioning wide area network bandwidth; and
interfacing, by a service plane device, with the control plane device to reserve the network resource based on a reservation request and the information from the management plane device, the management plane device, control plane device, and service plane device being associated with the at least one end-site;
configuring network devices associated with a local area network, by at least one network device controller (NDC), the local area network being associated with the at least one end-site;
controlling, by an end-site domain controller (ESDC) a resource associated with the local area network using the at least one NDC; and
interfacing, by a distributed services module (DSM), with the at least one ESDC to configure path segments associated with the local area network, the DSM being configured to interface with an inter-domain controller (IDC) to provide the path from the at least one end-site.

18. The method defined by claim 17, further comprising scheduling at least one end-to-end path interconnecting at least two different end-sites, method being associated with at least one of the at least two different end-sites.

19. The method defined by claim 18, further comprising:
negotiating, by the DSM, end-site LAN reservation parameters; and
negotiating, subsequently, WAN reservation parameters using the IDC in a hybrid star/daisy-chain configuration scheme.

20. The method defined by claim 17, wherein the network resource comprises at least one local area network operatively coupled to at least one wide area network, the at least one local area network and the at least one wide area network being interconnected by communication links.

21. The method defined by claim 17, further comprising hiding configuration information from the control plane device and management plane device by the NDC including functionality of the network resource.

22. The method defined by claim 17, further comprising establishing dynamic service level agreements (SLAs) between network domains along the path from the at least one end-site.

23. The method defined by claim 17, further comprising:
consolidating, by the service plane device, overlapping reservation requests using user-defined virtual local area network identification (VLAN ID), bandwidth utilization levels, and total capacity constraints; and assigning, by the service plane device, consolidated reservation requests to a circuit based on duration and capacity associated with the circuit.

24. The method defined by claim 17, further comprising:
generating, by the service plane device, a bandwidth usage graph (BUG) associated with at least one prior reservation request as a step function; and
subtracting, by the service plane device, the BUG from a maximum bandwidth availability associated with the network resource to obtain a bandwidth availability graph (BAG) associated with the network resource.

25. The method defined by claim 24, further comprising:
intersecting a plurality of BAGs to obtain an end-to-end BAG, each of the plurality of BAGs being associated with at least one of a plurality of network resources associated with the path from the at least one end-site; and
allocating, by the service plane device, a new reservation request based on the end-to-end BAG.

26. The method defined by claim 25, further comprising:
allocating, by the service plane device, the new reservation request based on the end-to-end BAG using an algorithm to determine largest rectangles under a histogram; and
modifying, by the service plane device, bandwidth and duration associated with the new reservation request while maintaining data volume associated with the new reservation request constant, thereby fitting the new reservation request within the largest rectangles associated with the end-to-end BAG and satisfying at least one of earliest start time constraint and latest end time constraint associated with the new reservation request.

27. The method defined by claim 17, further comprising establishing, by the DSM, reservation parameters associated with the wide area network using a trial-and-error method with predetermined solutions.

28. The method defined by claim 17, further comprising:
negotiating, by a storage resource manager (SRM) associated with a storage resource, storage and transfer parameters; and
negotiating, by the SRM, network bandwidth reservation parameters with the DSM.

29. The method defined by claim 28, further comprising:
representing, by the SRM, storage system bandwidth availability as a bandwidth availability graph (BAG);
determining, by the DSM, network bandwidth reservation parameters using the BAG and reservation request parameters;
intersecting, by the DSM, a plurality of BAGs along the end-to-end path to obtain an end-to-end BAG, each of the plurality of BAGs being associated with at least one of a plurality of network resources along the path from the at least one end-site; and
allocating, by the DSM, a new reservation request based on the end-to-end BAG.

30. The method defined by claim 17, further comprising:
scheduling at least one end-to-end path from at least one end-site; and
provide network quality of service guarantees across multiple autonomous domains having different levels of hertogeneity in at least one of administrative policy, control plane technology, and data plane technology without at least one of prior inter-domain Service Level Agreements and predetermined configuration of network devices associated with the domains.

31. A non-transitory computer-readable storage medium comprising instructions that, when executed by a computing device, schedule reservations on a path from at least one end-site by performing a computer process comprising:
monitoring, by a management plane device, and providing information representing at least one of functionality, performance, faults, and fault recovery associated with a network resource;
scheduling, by a control plane device, the network resource by at least one of provisioning local area network quality of service, provisioning local area network bandwidth, and provisioning wide area network bandwidth; and
interfacing, by a service plane device, with the control plane device to reserve the network resource based on a reservation request and the information from the management plane device, the management plane device, control plane device, and service plane device being associated with the at least one end-site;
wherein the computer process further comprises: configuring network devices associated with a local area network, by at least one network device controller (NDC), the local area network being associated with the at least one end-site;
controlling, by an end-site domain controller (ESDC) a resource associated with the local area network using the at least one NDC; and
interfacing, by a distributed services module (DSM), with the at least one ESDC to configure path segments associated with the local area network, the DSM being configured to interface with an inter-domain controller (IDC) to provide the a path from the at least one end-site.

32. The computer-readable medium defined by claim 31, wherein the computer process is configured to schedule at least one end-to-end path interconnecting at least two different end-sites, the computer process being associated with at least one of the at least two different end-sites.

33. The non-transitory computer-readable storage medium defined by claim 31, wherein the computer process further comprises: negotiating, by the DSM, end-site LAN reservation parameters; and negotiating, subsequently, WAN reservation parameters using the IDC in a hybrid star/daisy-chain configuration scheme.

34. The non-transitory computer-readable storage medium defined by claim 31, wherein the computer process further comprises hiding configuration information from the control plane device and management plane device by the NDC including functionality of the network resource.

35. The non-transitory computer-readable storage medium defined by claim 31, wherein the computer process further comprises establishing dynamic service level agreements (SLAs) between network domains along the path from the at least one end-site.

36. The non-transitory computer-readable storage medium defined by claim 31, wherein the computer process further comprises: consolidating, by the service plane device, overlapping reservation requests using user-defined virtual local area network identification (VLAN ID), bandwidth utilization levels, and total capacity constraints; and assigning, by the service plane device, consolidated reservation requests to a circuit based on duration and capacity associated with the circuit.

37. The non-transitory computer-readable storage medium defined by claim 31 wherein the computer process further comprises: generating, by the service plane device, a bandwidth usage graph (BUG) associated with at least one prior reservation request as a step function; and subtracting, by the service plane device, the BUG from a maximum bandwidth availability associated with the network resource to obtain a bandwidth availability graph (BAG) associated with the network resource.

38. The non-transitory computer-readable storage medium defined by claim 37, wherein the computer process further comprises: intersecting a plurality of BAGs to obtain an end-to-end BAG, each of the plurality of BAGs being associated with at least one of a plurality of network resources associated with the path from the at least one end-site; and allocating, by the service plane device, a new reservation request based on the end-to-end BAG.

39. The non-transitory computer-readable storage medium defined by claim 38, wherein the computer process further comprises: allocating, by the service plane device, the new reservation request based on the end-to-end BAG using an algorithm to determine largest rectangles under a histogram; and modifying, by the service plane device, bandwidth and duration associated with the new reservation request while maintaining data volume associated with the new reservation request constant, thereby fitting the new reservation request within the largest rectangles associated with the end-to-end BAG and satisfying at least one of earliest start time constraint and latest end time constraint associated with the new reservation request.

40. The non-transitory computer-readable storage medium defined by claim 31, wherein the computer process further comprises establishing, by the DSM, reservation parameters associated with the wide area network using a trial-and-error method with predetermined solutions.

41. The non-transitory computer-readable storage medium defined by claim 31, wherein the computer process further comprises: negotiating, by a storage resource manager (SRM) associated with a storage resource, storage and transfer parameters; and negotiating, by the SRM, network bandwidth reservation parameters with the DSM.

42. The non-transitory computer-readable storage medium defined by claim 41, wherein the computer process further comprises: representing, by the SRM, storage system bandwidth availability as a bandwidth availability graph (BAG); determining, by the DSM, network bandwidth reservation parameters using the BAG and reservation request parameters; intersecting, by the DSM, a plurality of BAGs along the path from the at least one end-site to obtain an end-to-end BAG, each of the plurality of BAGs being associated with at least one of a plurality of network resources along the path from the at least one end-site; and allocating, by the DSM, a new reservation request based on the end-to-end BAG.

43. The non-transitory computer-readable storage medium defined by claim 31, wherein the computer process further comprises: scheduling at least one end-to-end path from at least one end-site; and provide network quality of service guarantees across multiple autonomous domains having different levels of hertogeneity in at least one of administrative policy, control plane technology, and data plane technology without at least one of prior inter-domain Service Level Agreements and predetermined configuration of network devices associated with the domains.

* * * * *